US012784174B2

(12) United States Patent
Braunstein

(10) Patent No.: US 12,784,174 B2
(45) **Date of Patent: *Nov. 3, 2026**

(54) MONITORING INTEGRITY OF CHARGING RAIL SYSTEM

(71) Applicant: Caterpillar Inc., Peoria, IL (US)

(72) Inventor: Michael Dennis Braunstein, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 208 days.

This patent is subject to a terminal disclaimer.

(21) Appl. No.: 18/902,586

(22) Filed: Sep. 30, 2024

(65) Prior Publication Data

US 2025/0022118 A1 Jan. 16, 2025

Related U.S. Application Data

(63) Continuation of application No. 17/741,212, filed on May 10, 2022, now Pat. No. 12,125,188.

(51) Int. Cl.
*G06T 7/00* (2017.01)
*B60L 3/04* (2006.01)
*B60L 3/12* (2006.01)

(52) U.S. Cl.
CPC .............. *G06T 7/0004* (2013.01); *B60L 3/04* (2013.01); *B60L 3/12* (2013.01); *G06T 2207/30184* (2013.01)

(58) Field of Classification Search
CPC ............. B60L 2200/36; B60L 2240/12; B60L 2240/62; B60L 2240/70; B60L 3/0023;
(Continued)

(56) References Cited

U.S. PATENT DOCUMENTS 7,594,441 B2 9/2009 Gudat et al.
8,678,977 B2 3/2014 Hase et al.
(Continued)

FOREIGN PATENT DOCUMENTS

CN 202623959 U 12/2012
CN 108923379 A 11/2018
(Continued)

OTHER PUBLICATIONS

Gomes-Mota J, Gusmao T; Over head line real-time tracking for automatic inspection or user interface enhancement; in 1 st International Conference on Applied Robotics for the Power Industry; Oct. 5, 2010; pp. 1-6; IEEE.

(Continued)

*Primary Examiner* — Peter D Le
(74) *Attorney, Agent, or Firm* — Lee & Hayes, PLLC

(57) ABSTRACT

Machines can operate based on electricity received from a charging rail system installed along a route at a worksite. Sensors on the machines capture image data indicating locations and/or orientations of components of the charging rail system. Machine controllers of the machine, and/or a worksite controller, can monitor the integrity of the charging rail system by detecting possible faults if the locations and/or orientations of one or more components vary by more than a threshold amount from target locations and/or orientations. The machine controllers and/or the worksite controller can also initiate one or more response actions when a possible fault in the charging rail system is detected.

20 Claims, 7 Drawing Sheets

(58) Field of Classification Search
CPC ...... B60L 3/04; B60L 3/12; B60L 5/39; B60L 50/53; B60M 1/28; B60M 7/003; G06T 2207/30184; G06T 7/0004
See application file for complete search history.

(56) References Cited

U.S. PATENT DOCUMENTS

| | | | | |
|---|---|---|---|---|
| 8,788,129 | B2 | 7/2014 | Hase et al. | |
| 9,142,063 | B2 | 9/2015 | Chen et al. | |
| 9,260,016 | B2 | 2/2016 | Saito et al. | |
| 9,346,361 | B2 | 5/2016 | Francke et al. | |
| 9,875,414 | B2 | 1/2018 | Naithani et al. | |
| 10,274,532 | B1 * | 4/2019 | Smith | B60R 16/03 |
| 10,740,894 | B2 * | 8/2020 | Morawitz | G01B 11/22 |
| 10,870,352 | B2 | 12/2020 | Ohman et al. | |
| 11,124,210 | B2 | 9/2021 | Weingartner et al. | |
| 11,374,415 | B2 * | 6/2022 | Schweitzer | B60L 53/14 |
| 2009/0119066 | A1 * | 5/2009 | Strong | G05B 23/0283 399/24 |
| 2011/0266108 | A1 * | 11/2011 | Kitaguchi | B60L 53/14 191/22 C |
| 2013/0018766 | A1 | 1/2013 | Christman | |
| 2013/0105264 | A1 | 5/2013 | Ruth et al. | |
| 2014/0041951 | A1 | 2/2014 | Tojima et al. | |
| 2014/0097054 | A1 * | 4/2014 | Francke | B60L 5/19 191/59.1 |
| 2014/0195091 | A1 * | 7/2014 | Saito | B60L 5/08 701/22 |
| 2015/0221222 | A1 * | 8/2015 | Hamada | G05D 1/0297 701/2 |
| 2020/0156676 | A1 * | 5/2020 | Chung | B61K 9/10 |
| 2021/0170896 | A1 * | 6/2021 | Machida | B60L 53/16 |
| 2021/0312210 | A1 * | 10/2021 | Ishiyama | G06T 7/70 |

FOREIGN PATENT DOCUMENTS

| | | | |
|---|---|---|---|
| EP | 1816264 | A1 | 6/2010 |
| EP | 3936369 | B1 | 6/2023 |
| JP | H09101114 | A | 4/1997 |
| JP | 2004291672 | A | 10/2004 |
| JP | 2008089524 | A | 4/2008 |
| JP | 4835506 | B2 | 12/2011 |
| JP | 2021148589 | A | 9/2021 |
| JP | 2022000642 | A | 1/2022 |
| KR | 101016024 | B1 | 2/2011 |
| WO | WO2020186296 | A1 | 9/2020 |
| WO | WO2021070098 | A1 | 4/2021 |
| WO | 2021155972 | A1 | 8/2021 |

OTHER PUBLICATIONS

Cloud-based solution for nationwide power line mapping; The International Archives of the Photogrammetry, Remote Sensing and Spatial Information Sciences, vol. 42, Jun. 4, 2019; pp. 119-126.

* cited by examiner

MONITORING INTEGRITY OF CHARGING RAIL SYSTEM

CROSS-REFERENCE TO RELATED APPLICATION

This application is a continuation of, and claims priority to, U.S. application Ser. No. 17/741,212, filed on May 10, 2022, the entirety of which is incorporated herein by reference.

TECHNICAL FIELD

The present disclosure relates to a charging rail system that can provide electrical power to machines traveling alongside the rail system, and more particularly, to a system for monitoring the integrity of the charging rail system.

BACKGROUND

Electrical systems that extend along a route can be configured to provide electricity to connected machines as the machines travel along the route. For example, a vehicle may have rods or other connectors that can establish and maintain an electrical connection with wires, charged rails, or other electrical systems that extend along a route, such as above the route and/or to a side of the route. Accordingly, the vehicle may travel along the route while maintaining a connection to the electrical system along the route, and operate at least in part using electricity received via the connection to the electrical system.

Various systems have been developed to connect machines to electrical systems that extend along a route. In some of these systems, machines may use image data to determine positions of the machines relative to the electrical systems, which can be used to maintain an electrical connection between the vehicle and the electrical systems during travel. For example, U.S. Pat. No. 9,346,361 to Francke et al. (hereinafter "Francke") describes a vehicle that uses video data to determine a position of the vehicle relative to overhead electrical wires during travel along a traffic lane. In Francke, the relative positions of the vehicle and the overhead electrical wires, determined using the video data, can be used to adjust movements of booms that connect the vehicle to the overhead electrical wires, to reduce the likelihood of the booms disconnecting from the overhead electrical wires during travel.

However, although Francke and other systems may use image data to determine positions of electrical systems relative to vehicles or other machines, such systems generally do not use such image data to determine the integrity of the electrical system itself. For example, if overhead electrical wires have fallen or are otherwise out of an expected or desired position, the system described by Francke may simply detect the current position of the electrical wires, and attempt to move the booms of the vehicle towards the detected current position of the electrical wires. The system described by Francke may not determine that the current position of the electrical wires is not the expected or desired position. The system described by Francke also may not note or flag any possible corresponding electrical disconnections or other possible faults with the electrical system itself.

The example systems and methods described herein are directed toward overcoming one or more of the deficiencies described above.

SUMMARY

According to a first aspect, a system includes a charging rail system, a machine, and a computing system. The charging rail system extends alongside a route at a worksite, and includes rails configured to provide electricity to machines traveling along the route. The machine includes one or more sensors configured to capture images of one or more components of the charging rail system. The computing system is configured to monitor the integrity of the charging rail system by determining, based on the images, a current position associated with the one or more components of the charging rail system, determining that the current position is different from a target position associated with the one or more components by at least a threshold amount, and identifying a possible fault in the charging rail system based on the current position being different from the target position by at least the threshold amount.

According to a second aspect, a machine includes traction devices, a conductor rod, at least one electrical element, at least one sensor, and a machine controller. The traction devices are configured to propel the machine along a route at a worksite. The conductor rod is configured to connect to rails of a charging rail system that extends alongside the route, and to receive electricity from the rails. The at least one electrical element is configured to charge or operate using the electricity received from the rails. The at least one sensor is configured to capture image data associated with one or more components of the charging rail system during travel of the machine along the route. The machine controller is configured to determine, based on the image data, a current position associated with the one or more components of the charging rail system, and to determine that the current position is different from a target position associated with the one or more components by at least a threshold amount. The machine controller is further configured to identify a possible fault in the charging rail system based on the current position being different from the target position by at least the threshold amount.

According to a third aspect, a worksite controller includes one or more processors and memory. The memory stores computer-executable instructions that, when executed by the one or more processors, cause the one or more processors to perform operations. The operations include receiving a first report from a first machine. The first report indicates a fault in a charging rail system that comprises rails extending alongside a route at a worksite and that provides electricity to machines electrically coupled with the rails during travel along the route. The operations also include instructing a second machine to investigate the fault and return a second report associated with the fault. The operations further include confirming the fault in the charging rail system based on the first report and the second report, and determining at least one response action in response to confirming the fault. The fault is indicated in the first report based on a determination by the first machine that a current position associated with one or more components of the charging rail system is different from a target position associated with the one or more components by at least a threshold amount.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

Figure 1:
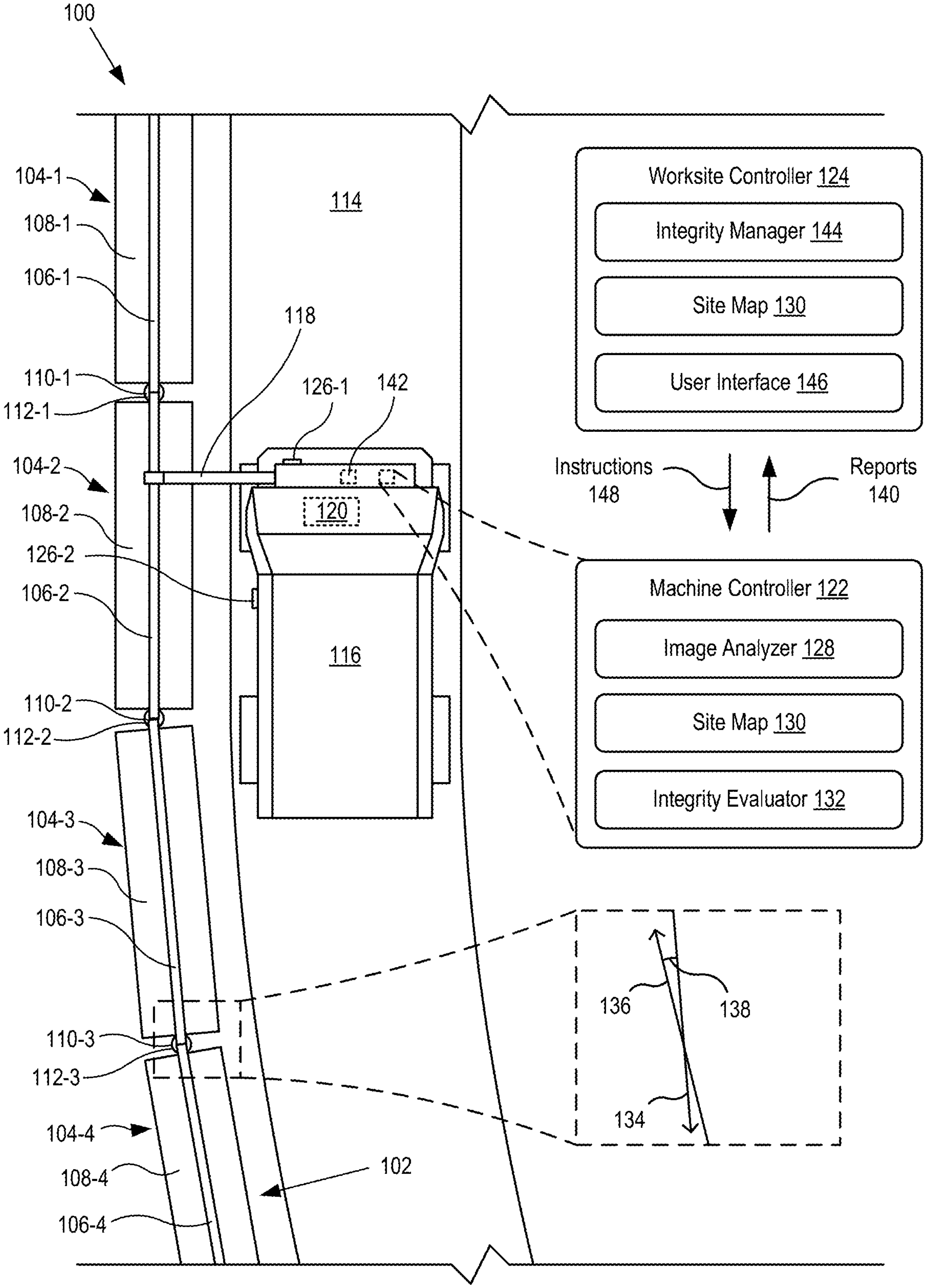
FIG. 1 shows an example of a worksite at which a charging rail system is configured to transfer electricity to machines operating at the worksite.

FIG. 1 shows an example of a worksite 100 at which a charging rail system 102 is configured to transfer electricity to machines operating at the worksite 100. The worksite 100 can be a mine site, a quarry, a construction site, or any other type of worksite or work environment. The machines can be electric haul trucks, and/or other types of machines, that operate at least in part using electricity received from the charging rail system 102.

The charging rail system 102 can include a series of segments 104, such as segment 104-1, segment 104-2, segment 104-3, segment 104-4, and/or other segments (collectively referred to as segments 104). The segments 104 can be associated with corresponding sections of rails 106 of the charging rail system 102, such as rails 106-1, rails 106-2, rails 106-3, rails 106-4, and/or other rails (collectively referred to as rails 106). The segments 104 can also include or be associated with other components, such as barriers 108, joints 110, and/or support poles 112, as described further below.

Figure 2:
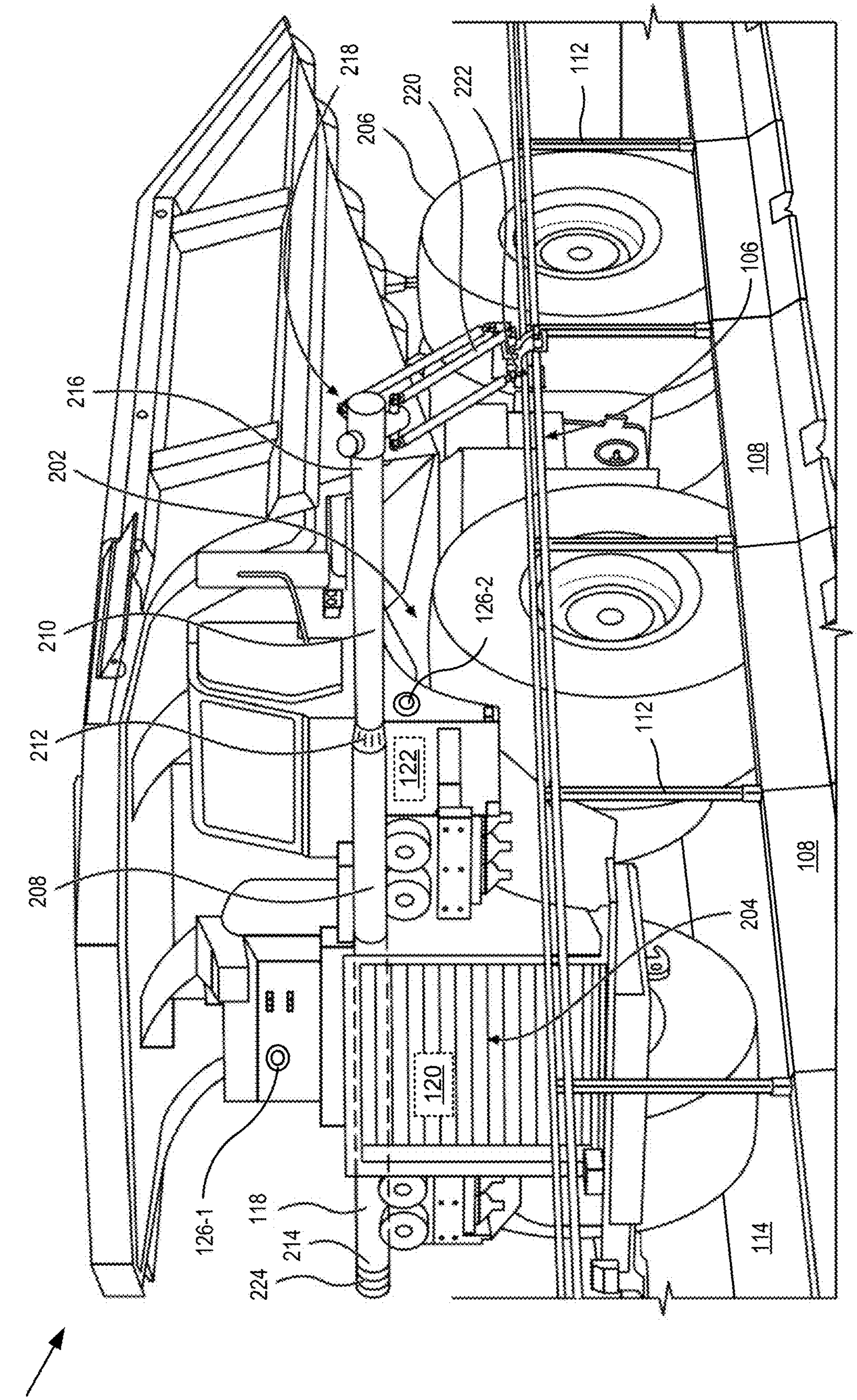
FIG. 2 shows an example of a machine traveling along a route that passes alongside segments of the charging rail system.

The rails 106 conduct electricity provided by a power source (not shown) at the worksite 100. The rails 106 accordingly provide a source of electrical power for the machines at the worksite 100 that connect to the rails 106, for example as either AC or DC. An example of a machine connecting to the rails 106 of the charging rail system 102 and operating based on electricity received from the rails 106 is shown in FIG. 2, and is described in more detail below with respect to FIG. 2. In some examples, the rails 106 can have two or more conductors, which can each provide voltage and current at a different electrical pole. For instance, in an example in which the rails 106 include three conductors, a first conductor provides positive DC voltage, a second conductor provides negative DC voltage, and a third conductor provides zero volts relative to the other two conductors. In this example, the two powered conductors within the rails 106 can provide +1500 VDC and 1500 VDC. However, these values are exemplary, and the rails 106 can be based on other physical and electrical configurations that may provide higher or lower voltages.

Figure 3:
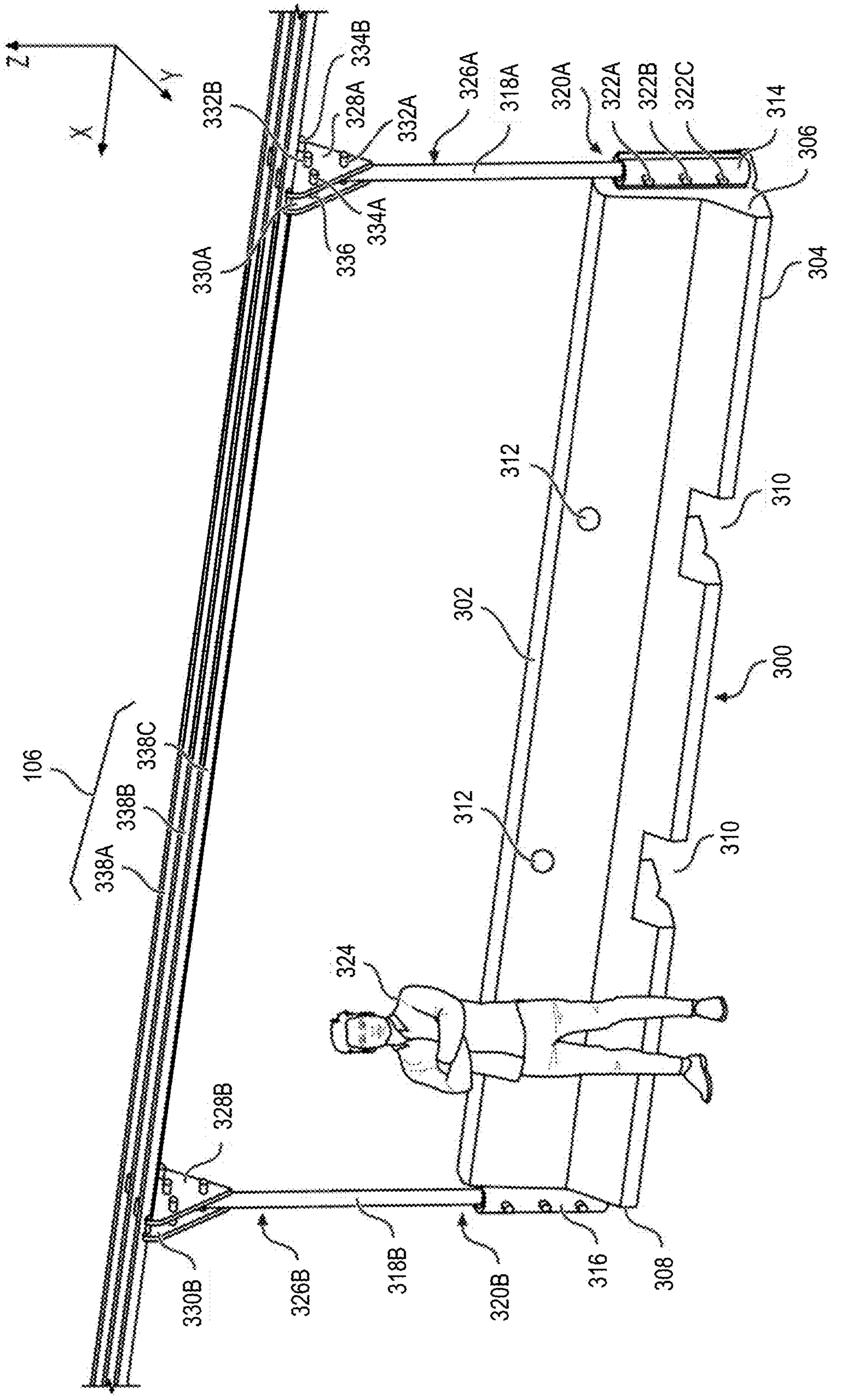
FIG. 3 shows an example of an individual segment of the charging rail system.

The segments 104 can include barriers 108, such as barrier 108-1, barrier 108-2, barrier 108-3, barrier 108-4, and/or other barriers (collectively referred to as barriers 108). The barriers 108 can rest on a surface of the worksite 100, and can support the rails 106 above the surface of the worksite 100. The rails 106 can be mounted on and/or above corresponding barriers 108, such that the barriers 108 support the rails 106. For example, segment 104-1 can include barrier 108-1, and rails 106-1 associated with segment 104-1 can be mounted on and/or above barrier 108-1. In some examples, the barriers 108 can be, or be similar to, concrete road barriers known as "Jersey barriers," or other types of road barriers. In other examples, the barriers 108 can be other types of support structures. The barriers 108 of the segments 104 can be movable by forklifts or other types of machines at the worksite 100, such that the barriers 108 can be placed at particular locations at the worksite 100 during initial installation, and/or can be later moved to other locations as operations at the worksite 100 change over time. An example of an individual segment including a barrier is shown in FIG. 3, and is described in more detail below with respect to FIG. 3.

In some examples, adjacent barriers 108 can be connected by joints 110, such as joint 110-1, joint 110-2, joint 110-3, and/or other joints (collectively referred to as joints 110). A particular joint can connect adjacent barriers 108 of corresponding adjacent segments 104, as discussed further below with respect to FIG. 3. For example, joint 110-2 shown in FIG. 1 connects barrier 108-2 of segment 104-2 to barrier 108-3 of segment 104-3. Although adjacent barriers 108 can be connected by joints 110 in some examples, in other examples adjacent barriers 108 may be substantially free-standing and not be directly connected to other barriers 108 by joints 110.

The charging rail system 102 can also include support poles 112, such as support pole 112-1, support pole 112-2, support pole 112-3, and/or other support poles (collectively referred to as support poles 112), that extend vertically upwards from barriers 108 and/or joints 110 between barriers 108. The support poles 112 can be supports for the rails 106, such that sections of the rails 106 can be mounted on the support poles 112 and extend between the support poles 112 above the barriers 108. For example, FIGS. 2 and 3, discussed further below, show support poles 112 of the charging rail system 102 that support rails 106 extending above the barriers 108.

The segments 104 of the charging rail system 102, including or associated with sections of rails 106, barriers 108, joints 110, support poles 112, and/or other components, can be modular and/or repositionable at the worksite 100. A series of segments 104 can be installed along the side of a route 114 at the worksite 100, such as a roadway, path, or other route, as shown in FIG. 1. Accordingly, connected rails 106 of the charging rail system 102 that extend along the side of the route 114 can provide electricity to machines that travel along the route 114 and that maintain electrical connections to the rails 106.

As an example, FIG. 1 shows a machine 116 with a conductor rod 118 that extends from the machine 116 to the rails 106. The conductor rod 118 can conduct electricity from the rails 106 to electrical components of the machine 116, for instance to charge a battery 120 of the machine 116 and/or to power operations of the machine 116. FIG. 2, discussed further below, shows another example of the machine 116 connecting to the charging rail system 102 via the conductor rod 118 and operating based on electricity received from the rails 106.

Components of the charging rail system 102 can be installed next to the route 114 such that individual components are placed at specific desired locations at the worksite 100, and are positioned to have specific desired orientations in three-dimensional space and/or relative to a ground surface of the worksite 100, to the route 114, to machines, and/or to other components. However, although segments 104 and associated components can be initially installed at specific locations and/or to have specific orientations, the segments 104 and/or individual components may move over time after installation due to vibrations, ground settling, impacts from machines or other external objects, and/or other factors as described herein. If overall segments 104, or individual components of segments 104, move from expected target locations and/or orientations beyond threshold amounts, electrical connections associated with the rails 106 can become loose or broken, and thereby impact the ability of the charging rail system 102 to provide electricity to machines along the route 114. Additionally, if any of the segments 104 or associated components move over time toward, or into, the route 114, such segments 104 or components may impede travel of machines along the route 114.

Figure 7:
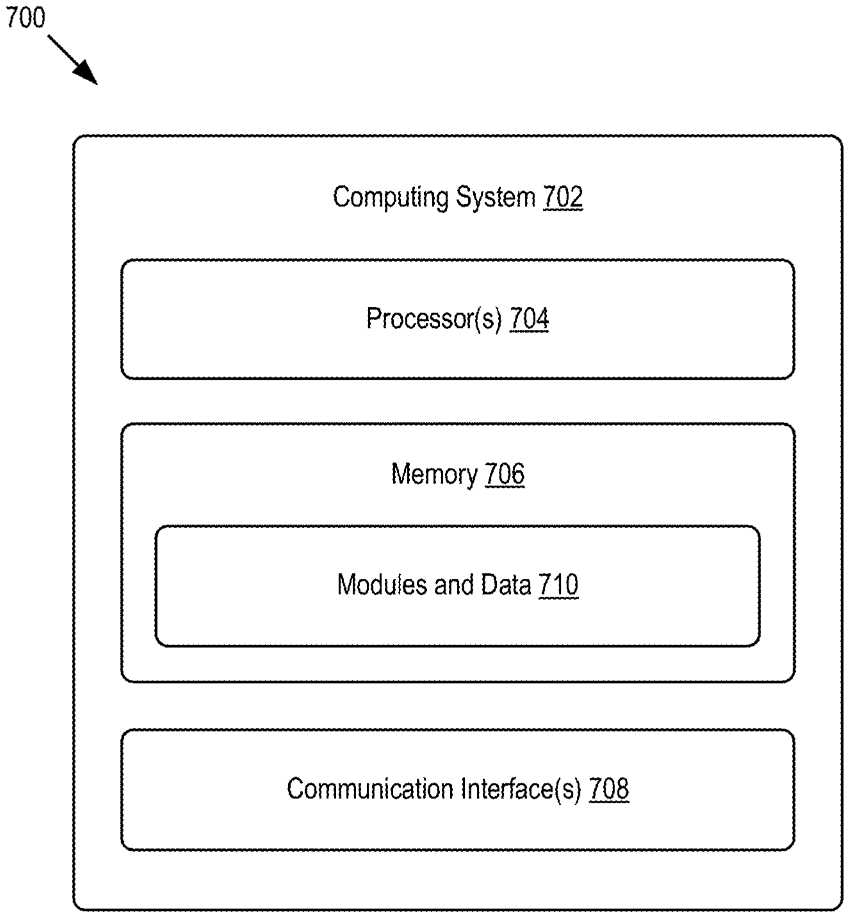
FIG. 7 shows an example system architecture for a computing system.

Accordingly, a machine controller 122 of the machine 116, similar machine controllers of other machines at the worksite 100, and/or a worksite controller 124 can be configured to monitor the integrity of the charging rail system 102 at the worksite 100 over time. The machine controller 122 can be a computing system that is on-board the machine 116. The worksite controller 124 can be one or more servers, computers, or other off-board computing devices that are separate from the machines at the worksite 100. For example, while the machine 116 and/or other machines can be located at the worksite 100, the worksite controller 124 can be located at a back office or other location that is remote from the machines at the worksite 100, or that is remote from the worksite 100 overall. FIG. 7, discussed further below, describes an example system architecture for a computing system associated with the machine controller 122 or the worksite controller 124.

In some examples, if a machine controller or the worksite controller 124 determines that a current position associated with of any components of the charging rail system 102 is different from a corresponding expected target position by more than a threshold amount, the machine controller 122 or the worksite controller 124 can output notifications, instructions, or other data that may initiate further inspection and/or repair of the components, as described further below. The current positions and/or expected target positions associated with components of the charging rail system 102 can indicate locations of the components at the worksite 100, and/or three-dimensional or relative orientations of the components at those locations.

For example, the machine 116 and other machines at the worksite 100 can have sensors 126, such as sensor 126-1 and 126-2 (collectively referred to as sensors 126), that capture images. Images captured by the sensors 126 include visual images, infrared images, depth information, distance information, and/or other sensor data. The sensors 126 can, for example, include cameras, LIDAR sensors, RADAR sensors, and/or other optical sensors or perception systems. Cameras may include still-image cameras, stereo cameras that capture three-dimensional image data, video cameras, infrared cameras, and/or any other type of camera. In some examples, sensor 126-1 can be a forward-facing sensor that captures images ahead of the machine 116, while sensor 126-2 can be a side-facing sensor that captures images to a side of the machine 116. In other examples, the machine 116 may have fewer or more than two sensors 126, and/or may have sensors 126 that are oriented at different angles and/or are at different locations on the machine 116.

Images captured by the sensors 126 can indicate locations and/or orientations of segments 104 of the charging rail system 102. The images can also indicate locations and/or orientations of individual components associated with the segments 104, such as sections of the rails 106, barriers 108, joints 110, and/or support poles 112. For example, side-facing sensor 126-2 may capture images that indicate horizontal and/or vertical orientations of rails 106, barriers 108, support poles 112, and/or other components associated with one or more segments 104 located to a side of the machine 116. As another example, forward-facing sensor 126-1 may capture images that indicate horizontal and/or vertical orientations of rails 106, barriers 108, support poles 112, and/or other components associated with one or more segments 104 that are at least partially in front of the machine 116.

In some examples, image data captured by multiple sensors 126 can be used together to generate interpolated images, for instance based on combinations of different images. For instance, the machine controller 122 and/or the worksite controller 124 may be configured to use side images of an X-Z plane captured by a side-facing sensor of the machine 116, and front images of a Y-Z plane captured by a forward-facing sensor, to generate interpolated images of an X-Y plane that may show a top-down view of segments 104 and/or other components of the charging rail system 102.

Images captured by the sensors 126 of the machine 116 and/or other machines can accordingly indicate current positions, such as locations and/or orientations, associated with components of the charging rail system 102. The machine controllers and/or the worksite controller 124 can be configured to compare the current positions with corresponding target positions, such as previous and/or expected positions, to determine if and/or when the components have moved out of position by more than threshold amounts and/or may be associated with possible faults in the charging rail system 102, as discussed further below.

The machine 116 and/or other machines at the worksite 100 can be battery electric machines (BEMs), battery electric vehicles (BEVs), hybrid vehicles, fuel cell and battery hybrid vehicles, or other mobile machines or vehicles that operate based at least in part using electricity received from the rails 106 of the charging rail system. The machines can be configured to maintain electrical connections with the rails 106 while the machines travel along the route 114, such that the machines can receive electricity from the rails 106 as the machines are in motion during travel along the route 114.

The rails 106 can accordingly provide electricity that can charge batteries of the machines, and/or can power operations of the machines. For instance, batteries of the machines, such as battery 120, can be lithium-ion (Li-ion) batteries, lithium-ion polymer batteries, nickel-metal hydride (NiMH) batteries, lead-acid batteries, nickel cadmium (Ni—Cd) batteries, zinc-air batteries, sodium-nickel chloride batteries, or other types of batteries that can at least partially power the machines and/or that can be charged via the charging rail system 102.

In some examples, the machine 116 and/or other machines at the worksite 100 can be electric haul trucks that operate at least in part by using electricity received via the charging rail system 102. The worksite 100 can be a mine site, such that the machine 116 and/or other machines can haul loads within or from the worksite 100 in association with a mining operation. For instance, the machine 116 may haul excavated ore, or other earthen materials, from an excavation area along the route 114 to one or more dump sites, and then return to the excavation area. In this arrangement, the machine 116 may be one of many similar machines at the worksite 100 that are configured to ferry earthen material in a trolley arrangement. In other examples, the machine 116 and/or other machines at the worksite 100 may be other types of machines that carry loads between different locations within the worksite 100, such as articulated trucks, off-highway trucks, on-highway dump trucks, wheel tractor scrapers, and/or any other similar machines. In still other examples, the machine 116 and/or other machines at the worksite 100 may be loaders, excavators, pipe layers, motor graders, and/or other types of mobile machines. For instance, the machine 116 may perform other operations at the worksite 100 instead of, or in addition to, hauling loads, and may be any machine associated with various industrial applications including, but not limited to, mining, agriculture, forestry, construction, and other industrial applications.

The machine 116 and/or other machines at the worksite 100 can be staffed machines, semi-autonomous machines, or autonomous machines. In examples in which a machine is a staffed machine or a semi-autonomous machine, a human operator or driver can operate, control, or direct some or all of the functions of the machine. However, in examples in which a machine is autonomous or semi-autonomous, functions of the machine, such as steering, speed adjustments, work tool positioning and movement, and/or other functions can be fully or partially controlled, automatically or semi-automatically, by on-board and/or off-board controllers or other computing devices associated with the machine.

For instance, in some examples, the machine controller 122, an electronic control module (ECM), and/or another on-board computing device can fully or partially control operations of the machine 116. For example, the machine controller 122 and/or a separate ECM can implement an on-board guidance system that can drive the machine 116 through the route 114 autonomously, an obstacle detection system that assists the on-board guidance system or can alert a human operator of nearby objects detected by the obstacle detection system, and/or other systems that fully or partially control operations of the machine 116. As another example, an off-board computing device, such as the worksite controller 124 or another remote computing system, can receive data from the machine 116 and return instructions to the machine controller 122 and/or an ECM of the machine 116 to fully or partially control operations of the machine 116 remotely.

As described above, the sensors 126 of the machine 116, and/or other machines, can include cameras, LIDAR sensors, RADAR sensors, and/or other optical sensors or perception systems. The sensors 126 of the machine 116, and/or other machines, can also include other types of sensors, such as Global Positioning System (GPS) sensors, other location and/or positioning sensors, payload monitors, speed sensors, temperature sensors, tire pressure sensors, battery state of health (SoH) sensors, and/or other types of sensors. Location data provided by GPS sensors and/or other location or positioning sensors of the machine 116 can, in some examples, be used to determine a current location of the machine 116 at the worksite 100. Images and/or other sensor data captured by sensors 126 of the machine 116 can be used by an on-board guidance system and/or an obstacle detection system of the machine 116 to detect objects and/or other surroundings around the machine 116, to assist with determining autonomous or semi-autonomous operations of the machine 116.

As described herein, images provided by the sensors 126 of the machine 116 can also be used to determine positions of components of the charging rail system 102, and can accordingly be used to evaluate the integrity of the charging rail system 102. For example, the machine controller 122 of the machine 116 and/or the worksite controller 124 can include an image analyzer 128 that is configured to process images, provided by the sensors 126 of the machine 116, to identify segments 104 and detect current positions of segments 104 and components of segments 104. For instance, the image analyzer 128 can be configured to identify components of the charging rail system 102 shown in images, such as sections of the rails 106, tops of barriers 108, other portions of barriers 108, support poles 112, and/or other components of the charging rail system 102. Based on identifying such components of the charging rail system 102 shown in an image, the image analyzer 128 can also be configured to use the image to determine the positions, such as locations and/or orientations, of the components. As shown in FIG. 1, in some examples the image analyzer 128 can be executed by the machine controller 122 of the machine 116 to analyze images provided by sensors 126 of the machine 116. However, in other examples, the image analyzer 128 can be executed by the worksite controller 124 to analyze images captured by sensors 126 of one or more machines that have been transmitted to the worksite controller 124.

In some examples, the image analyzer 128 can be based on a machine learning system that has been trained on a set of sample images showing various components of the charging rail system 102. Accordingly, the machine learning system can be trained to learn shapes, colors, and/or other information within images that are associated with components of the charging rail system 102, such that the image analyzer 128 can identify such components of the charging rail system 102 in new images captured by the sensors 126, and/or determine positions of the components.

In other examples, the image analyzer 128 can be configured to use other image processing techniques or methods to identify components of the charging rail system 102 that are shown in images captured by the sensors 126, and/or determine positions of the components. As an example, if rails 106 are generally shown at a top-left portion of front-facing images, the image analyzer 128 can be configured to search for linear and/or elongated shapes shown in the top-left portions of new images, as such shapes may be likely to be sections of the rails 106. As another example, components of the charging rail system 102 can be painted or otherwise marked with indicia, such as dots, lines, dashed lines, shapes, and/or other patterns or markings. In some examples, indicia on individual components may also, or alternately, include numbers, barcodes, or other markings that uniquely identify the individual components, such that the image analyzer 128 can use the indicia to determine which specific components are shown in images captured by the sensors 126.

The image analyzer 128 can be configured to search for and recognize indicia associated with one or more components of the charging rail system 102 in order to identify specific components shown within images captured by the sensors 126, and to determine positions or orientations of the components. As a non-limiting example, the top of a barrier can be marked with a series of dots of a particular color, and the image analyzer 128 can be configured to search an image for dots of that particular color to identify portions of the image that represent the top of a barrier. The image analyzer 128 can also determine a direction of a line that spans the series of dots at the top of the barrier, in order to determine a three-dimensional and/or relative orientation of the barrier.

The image analyzer 128 can also, in some examples, be configured to use image data to determine positions, such as locations and/or orientations, of some components of the charging rail system 102 relative to other components of the charging rail system 102. For example, the image analyzer 128 may use one or more images to identify two adjacent barriers 108, determine linear directions along the tops of the two barriers 108, and determine a difference between the linear directions to identify orientations of the two barriers 108 relative to each other. As another example, the image analyzer 128 may identify specific indicia marked at ends of adjacent barriers, and based on the shape and/or orientations of the indicia, determine an angular difference between the orientations of the two barriers 108.

The machine controller 122 and/or the worksite controller 124 can maintain a site map 130 that indicates previously determined, and/or expected, positions of individual components of the charging rail system 102. The site map 130 can indicate locations of the components at the worksite 100, as well as orientations of the components at those locations. For example, the site map 130 can indicate, for a particular barrier at a particular location at the worksite 100, an expected orientation of the barrier based on the initial installation of the barrier at the particular location. As another example, the site map 130 can indicate an orientation of a particular component of the charging rail system 102, based on data associated with the particular component that was previously determined by the machine controller 122 of the machine 116, by machine controllers of one or more other machines at the worksite 100, and/or by the worksite controller 124. The site map 130 can accordingly indicate target positions associated with individual components, and/or multiple components, of the charging rail system 102. In some examples, target positions indicated in the site map 130 for adjacent components may be defined or expressed as a maximum threshold difference between the relative locations and/or orientations of the adjacent components.

In some examples, the machine 116, or a different machine, may have traversed the route 114 during or shortly after the installation of the charging rail system 102 alongside the route 114, to capture images that show the original locations and/or orientations of components of the charging rail system 102. Accordingly, positions of such components indicated by the images captured during or shortly after the original installation of the components can be used as a baseline of expected target positions of the components in the site map 130. In other examples, the machine 116 can use repeated passes through the route 114 over time to determine updated positions of the components of the charging rail system 102, and store each update in the site map 130 as the most recent prior positions of the components.

The machine controller 122 and/or the worksite controller 124 can also have an integrity evaluator 132 that is configured to use the current positions of one or more components of the charging rail system 102, determined by the image analyzer 128 based on images captured by the sensors 126, to identify possible faults in the charging rail system 102. As shown in FIG. 1, in some examples the integrity evaluator 132 can be executed by the machine controller 122 of the machine 116. However, in other examples, the integrity evaluator 132 can be executed by the worksite controller 124.

In some examples, the image analyzer 128 and/or the integrity evaluator 132 can determine, based on the current location of the machine 116 indicated by GPS coordinates or other positioning sensors of the machine 116 and locations of individual components of the charging rail system 102 indicated in the site map 130, which specific components of the charging rail system 102 were proximate to the machine 116 when images were captured, and may therefore be shown in the images analyzed by the image analyzer 128. Accordingly, location data determined by GPS sensors or other sensors 126 of the machine 116 can be used by the image analyzer 128 and/or the integrity evaluator 132 to identify particular components of the charging rail system 102 at locations at the worksite 100, and thereby identify particular components of the charging rail system 102 that may be associated with possible faults. As discussed above, the components may also be marked with unique numbers, barcodes, or other unique indicia, such that the image analyzer 128 and/or the integrity evaluator 132 can identify particular components of the charging rail system 102 based on corresponding unique indicia.

In some examples, the integrity evaluator 132 can compare current positions of components of the charging rail system 102, determined by the image analyzer 128 based on images captured by the sensors 126, against target positions, such as the previously-determined and/or expected positions associated with those components indicated by the site map 130. If the integrity evaluator 132 determines that the current position of any component of the charging rail system 102 is different than the target position of that component by more than a threshold amount, the integrity evaluator 132 may determine that a possible fault may exist, or may be developing, in the charging rail system 102 in association with that component.

The integrity evaluator 132 can also evaluate current positions of adjacent components of the charging rail system 102 to determine if a relative difference between the current positions of the adjacent components exceeds a threshold amount indicated by corresponding target position data stored in the site map 130. For example, the site map 130 may indicate that the linear orientations of two adjacent barriers 108 can, at maximum, be 10 degrees or any other threshold maximum angle apart.

In some examples, the threshold maximum angle may be equal to or less than a maximum connection angle supported by a joint between the two adjacent barriers 108. For instance, the structure of the joints 110 can be configured to allow adjacent barriers 108 to extend, when viewed from above, along lines that are angled at less than or equal to a maximum angle of 10 degrees, or any other maximum angle, relative to each other. Similarly, other elements of the charging rail system 102, such as lines extending through sections rails 106 associated with individual segments and/or through the tops of barriers 108 of individual segments, can be associated with threshold maximum angles relative to each other.

The threshold maximum angles associated with adjacent components of the charging rail system 102 can be indicated in the site map 130 in association with those particular components. If image data indicates that two adjacent components of the charging rail system 102 are oriented along lines that differ by more than a threshold maximum angle, the angle of a bend between the two components may have caused, or may cause, a possible fault in the charging rail system 102. Accordingly, the integrity evaluator 132 may determine that a possible fault may exist, or may be developing, in the charging rail system 102 in association with those components.

As a non-limiting example, the image analyzer 128 and/or the integrity evaluator 132 can use image data to determine that segment 104-3 is oriented along a first line 134, and that adjacent segment 104-4 is oriented along a second line 136. The image analyzer 128 and/or the integrity evaluator 132 can compare the orientations of the first line 134 and the second line 136, and determine that the orientations of the first line 134 and the second line 136 differ by an angle 138, as shown in FIG. 1. If the angle 138 is greater than a threshold maximum angle associated with segment 104-3 and segment 104-4 indicated by the site map 130, the integrity evaluator 132 may determine that a possible fault may exist, or may be developing, in the charging rail system 102 in association with segment 104-3 and segment 104-4.

In other examples, the integrity evaluator 132 may use other types of data, instead of or in addition to image data, to determine that a possible fault may exist, or may be developing, in the charging rail system 102. For example, if the machine 112 has been receiving electricity from the rails 106 via the conductor rod 118 while traveling along the route 114, but suddenly stops receiving electricity or starts receiving a lower amount of electricity when the machine 116 is next to a particular segment, the integrity evaluator 132 may determine that a possible fault in the charging rail system 102 may exist at or near that particular segment.

In still other examples, positional data indicating locations and/or orientations of one or more components, and/or other data, may indicate damage to one or more components of the charging rail system 102 that may prevent machines from accessing electricity from the rails 106 or that may potentially damage elements of machines. For instance, images and/or other sensor data may indicate that a barrier, a section of rails 106, and/or other components of one or more segments 104 have fallen into or toward the route 114, such that the components may at least partially block the route 114 and/or impact and damage the machine 116 if the machine 116 continues travel along the route 114. Accordingly, the integrity evaluator 132 may determine that a possible fault in the charging rail system 102 may exist at or near that particular segment based on such indications.

If the integrity evaluator 132 detects, based on image data and/or other data, a possible fault in the charging rail system 102, the integrity evaluator 132 may cause the machine controller 122 and/or the worksite controller 124 to display one or more alerts or notifications via a screen or other user interface. For example, such an alert or notification can be presented via a dashboard display or other user interface on-board the machine 116 to inform a human operator of the machine 116 about the possible fault, such that the human operator can investigate or confirm the possible fault. However, in examples in which the machine 116 in an autonomous machine, the machine 116 may lack an on-board user interface and a human operator may not be present on the machine 116. Accordingly, an instance of the integrity evaluator 132 on-board the machine 116 may also, or alternately, cause reports 140 associated with possible faults to be sent to the worksite controller 124 and/or to other machines as described further below.

For instance, if the integrity evaluator 132 on-board the machine 116 detects, based on image data and/or other data, possible faults in the charging rail system 102, the integrity evaluator 132 may cause the machine controller 122 to send one or more reports 140 associated with the possible faults to the worksite controller 124 and/or to other machines. The machine 116, other machines, and/or the worksite controller 124 can have, or be associated with, wireless communication interfaces 142, such as cellular interfaces, WiFi® interfaces, Bluetooth® interfaces, machine-to-machine data interfaces, and/or other types of wireless communication interfaces. The wireless communication interfaces 142 can include modems, receivers, transmitters, antennas, and/or other hardware or software elements configured to send and receive data.

In some examples, the reports 140 can indicate possible faults in the charging rail system 102 detected by the integrity evaluator 132 on-board the machine 116, and/or identify one or more specific components of the charging rail system 102 that may be associated with the possible faults. The reports 140 may also include images captured the sensors 126 of the machine 116 that may show the possible faults and/or the corresponding components of the charging rail system 102. The reports 140 may also indicate current positions of the components, determined by the image analyzer 128 on-board the machine.

In some examples, the machine controller 122 can also be configured to transmit reports 140 to the worksite controller 124 in other situations, for instance even if the integrity evaluator 132 on-board the machine 116 has not detected possible faults with the charging rail system 102. For example, if the sensors 126 of the machine 116 have captured image data associated with one or more components of the charging rail system 102 that the integrity evaluator 132 on-board the machine 116 determines are not associated with a possible fault, the machine controller 122 may nevertheless send reports 140 to the worksite controller 124 that include the image data and/or corresponding data indicating current positions of those components. In other examples, the machine controller 122 can be configured to periodically or occasionally transmit reports 140 to the worksite controller 124 that include captured images, corresponding position data, and/or other data, such that instances of the image analyzer 128 and/or the integrity evaluator 132 executing at the worksite controller 124 can analyze the captured images, corresponding position data, and/or other data as described herein.

In examples in which the machine controller 122 of machine 116 sends reports 140 directly to one or more other machines at the worksite 100, the reports 140 can cause the other machines to perform operations to confirm the possible faults and/or gather additional data about the possible faults. For example, if the integrity evaluator 132 of machine 116 determines that a possible fault may exist with segment 104-2, the machine controller 122 of machine 116 may send a corresponding report associated with segment 104-2 to a second machine at the worksite 100 that is traveling behind machine 116 on the route 114. Accordingly, when the second machine approaches or reaches a location on the route 114 near segment 104-2, sensors 126 of the second machine can capture additional images of segment 104-2. A machine controller of the second machine can determine whether the fault with segment 104-2 can be confirmed based on positions indicated by the additional images, and/or the machine controller of the second machine can send the additional images of segment 104-2 in a report to the worksite controller 124.

In examples in which the machine controller 122 of machine 116, and/or other machine controllers of other machines, send reports 140 to the worksite controller 124, an integrity manager 144 of the worksite controller 124 can use the reports 140 to identify possible faults in the charging rail system 102, update information about possible faults in the charging rail system 102, and/or determine responses to possible faults in the charging rail system 102. The integrity manager 144 can, in some examples, include instances or versions of the image analyzer 128 and/or the integrity evaluator 132 described herein.

The worksite controller 124 can maintain a version of the site map 130 that indicates information about components of the charging rail system 102 at the worksite, including data indicating target positions associated with the components. The data associated with the target positions can, for example, indicate previous and/or expected positions of the components, and/or threshold values associated with allowable movements and relative orientations of the components.

The site map 130 at the worksite controller 124 may also indicate current locations of the machine 116 and/or other machines at the worksite 100, paths of the route 114 and/or other routes at the worksite 100, and/or other information about the worksite 100. Based on reports 140 associated with the charging rail system 102 received from machine controllers of one or more machines, the integrity manager 144 of the worksite controller 124 can update the site map 130. As an example, if reports 140 received from one or more machines indicate, and/or instances of the image analyzer 128 and/or the integrity evaluator 132 at the worksite controller 124 determine, that barrier 108-3 of segment 104-3 is out of position by more than a threshold amount, the integrity manager 144 can update the site map 130 to indicate the current position of the barrier 108-3 and/or to flag the barrier 108-3 as being associated with a possible fault in the charging rail system 102.

As another example, if sets of reports 140 received over a period of time indicate that a component has been moving, relative to previous positions, by small amounts over the period of time, the worksite controller 124 can add data to the site map 130 that tracks the movement of the component over time. If the movement of the component has not exceeded a threshold amount, the integrity manager 144 may be configured to determine a movement trend based on the historical movement of the component, and predict when the component is likely to have moved out of position by more than the threshold amount. For example, based on the current position of the component, the historical movement trend associated with the component, and/or how the historical movement trend has changed over time, the integrity manager 144 can predict or project when the component will likely have moved out of a target position by more than the threshold amount. Accordingly, prior to the predicted time, the worksite controller 124 may assign one or more machines to capture additional image data associated with the component, and/or assign a technician to move the component back into place before a fault occurs due to the component moving out of position.

The worksite controller 124 may, in some examples, periodically or occasionally transmit copies of the site map 130 to the machine controllers of one or more machines. Accordingly, local instances of the image analyzer 128 and/or the integrity evaluator 132 executing at the machine controllers can use local copies of the site map 130 to determine target positions of components of the charging rail system 102. The local instances of the image analyzer 128 and/or the integrity evaluator 132 executing at the machine controllers can also use the target positions of the components to determine when and/or if a possible fault exists based on differences between the target positions and corresponding newly-determined positions of one or more components, or differences between newly-determined positions of adjacent components exceeding allowable thresholds indicated by the target positions, as described above.

Figure 6:
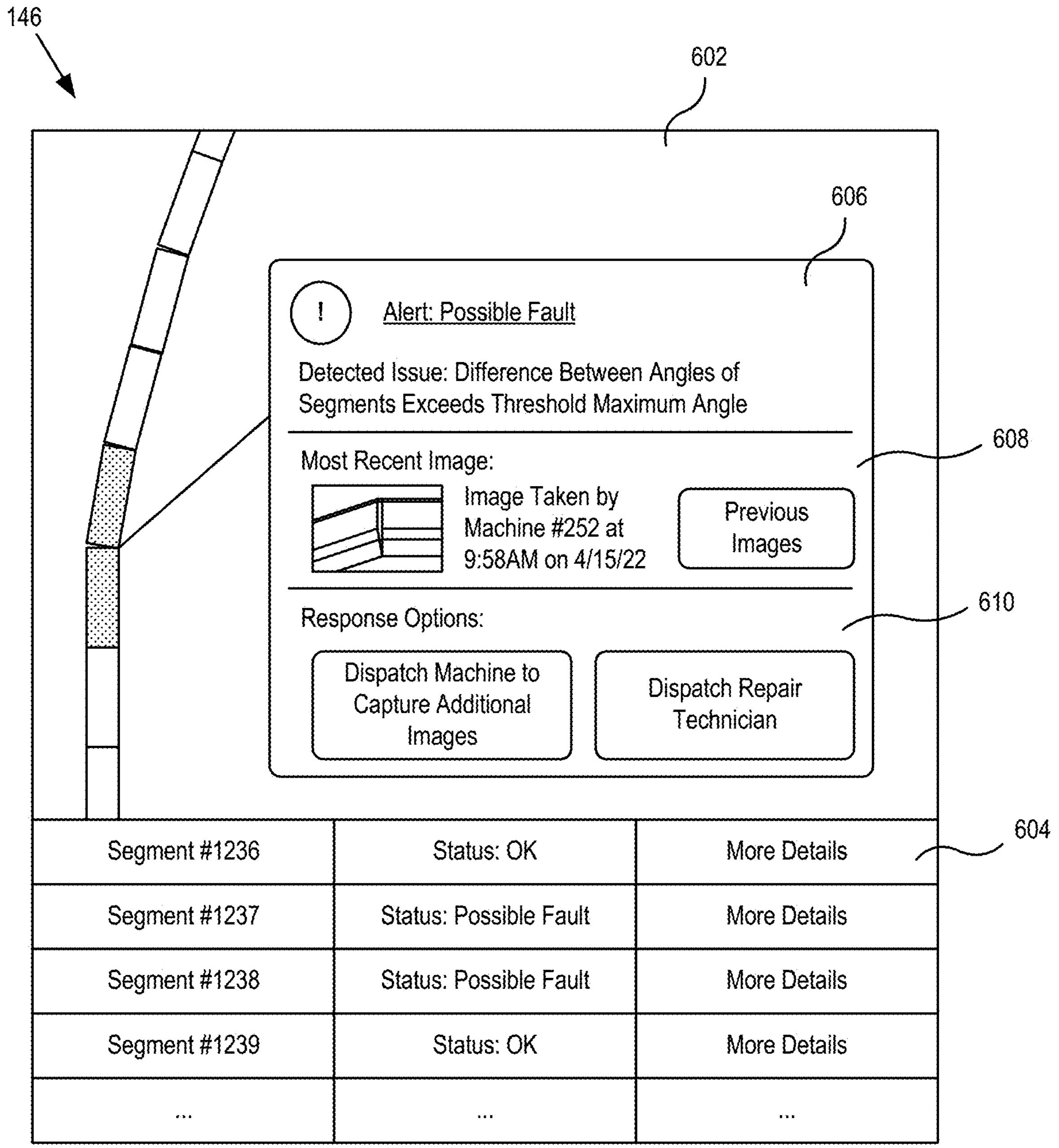
FIG. 6 shows an example of a user interface of a worksite controller.

In some examples, the worksite controller 124 can have a user interface 146 that can be accessed by one or more users via the worksite controller 124 or other computing devices. A non-limiting example of the user interface 146 is shown in FIG. 6, and is described further below with respect to that figure. The user interface 146 may display information associated with components of the charging rail system 102 based on the site map 130, reports 140, determinations by instances of the image analyzer 128 and/or the integrity evaluator 132 executing at the worksite controller 124, and/or other data. For example, the user interface 146 may display a visual map of segments 104 of the charging rail system 102, and the map may use different colors to identify the current status associated with various segments. As a non-limiting example, individual segments 104 can be displayed in the map in green if no faults have been detected, in yellow if possible faults have been detected, or in red if faults have been confirmed. As another example, the user interface 146 may display a list of some or all of the segments 104, or alerts and/or lists of any particular segments 104 associated with possible or confirmed faults.

In some examples, a user may be able to click on or otherwise select a representation of a particular segment in the user interface 146 to view additional information associated with the particular segment. For example, the user interface 146 may display a current location of the segment at the worksite 100, images of the segment provided by machine controllers in reports 140, a current position of the segment, any differences between the current position and a target position associated with the segment, alerts associated with possible or confirmed faults associated with the segment, and/or other data.

The integrity manager 144 of the worksite controller 124 can also transmit instructions 148 to the machine controller 122 of machine 116 and/or machine controllers of other machines at the worksite 100. The instructions 148 sent by the worksite controller 124 to a machine controller of a particular machine may identify particular components of the charging rail system 102 that are associated with possible faults, based on indications in reports 140 received from one or more other machines and/or based on determinations made by the integrity manager 144. The instructions 148 can also cause the machine controller to cause the machine to drive to, or past, the identified components of the charging rail system 102, and to cause sensors 126 of the machine to capture additional image data associated with the components. The instructions 148 can also cause the machine controller to determine additional positional data indicating current positions of the components, based on the additional image data. The additional image data and/or additional positional data may be used by the machine controller of the machine and/or the integrity manager 144 of the worksite controller 124 to attempt to confirm the possible fault.

As an example, if a report from a first machine controller of a first machine indicates a possible fault with segment 104-1, the integrity manager 144 may send instructions 148 to a second machine controller of a second machine to further investigate the possible fault with segment 104-1. Sensors 126 of the second machine may capture additional images of segment 104-1 and/or other components of the charging rail system 102, such that the second machine controller can determine additional positional data associated with segment 104-1 based on the additional images. If the additional positional data associated with segment 104-1 determined by the second machine controller also indicates a possible fault, the second machine controller and/or the integrity manager 144 may confirm the fault. However, if the additional positional data associated with segment 104-1 determined by the second machine controller does not indicate a possible fault, the possible fault indicated by the report from the first machine controller of the first machine may have been due to a miscalibration of sensors 126 of the first machine, or another issue. Accordingly, the integrity manager 144 may instruct one or more other machines to further investigate the possible fault in an attempt to confirm the possible fault.

In some examples, the sensors 126 of the machine 116 and/or other machines may capture higher-quality image data that may better indicate possible faults with the charging rail system 102 if the machine 116 and/or the other machines are traveling at slower than a maximum observation speed. For example, if the machine 116 is traveling at above the maximum observation speed, images captured by the sensors 126 may be relatively blurry, such that it may be relatively difficult for the image analyzer 128 to identify components and detect positions of the components. However, if the machine 116 is traveling at or below the maximum observation speed, images captured by the sensors 126 may be clearer and allow the image analyzer 128 to more accuracy identify components and detect positions of the components. In these examples, if a report from a first machine indicates a possible fault associated with a particular component of the charging rail system 102, instructions 148 from the worksite controller 124 can instruct a second machine to travel by that particular component at no more than the maximum observation speed, such that sensors 126 of the second machine can capture high-quality images that may better indicate the presence or absence of the possible fault.

As another example, if the machine 116 is traveling along the route 114 at above the maximum observation speed, and images captured by the forward-facing sensor 126-1 indicate a potential fault with segment 104-1 in front of the machine 116, the machine controller 122 may cause the machine 116 to slow down to a speed that is equal to or below the maximum observation speed as the machine 116 passes by the segment 104-1. Accordingly, the side-facing sensor 126-2 of the machine 116 may be able to capture clearer and/or higher-quality images of segment 104-1 that may better indicate the presence or absence of the possible fault.

As yet another example, the machine 116 may be assigned to traverse the route 114 multiple times a day as part of a repeated work cycle that involves travel from a source to a destination via the route 114. The worksite controller 124 may instruct the machine 116 to travel at no more than the maximum observable speed during every fifth work cycle through the route 114, or at other intervals, so that high quality images of components of the charging rail system 102 that may indicate possible faults can be captured during at least some of the work cycles.

Although in some examples the machine 116 and/or other machines can be instructed to travel at, or lower than, the maximum observation speed so that the sensors 126 capture high-quality images of components of the charging rail system 102 as described above, in other examples the sensors 126 can be high frame rate cameras or other sensors that can capture high-quality images when the machine 116 is traveling at substantially any speed. Accordingly, in these examples, the machine 116 can travel at any speed, and may not need to slow to a slower observation speed, while the sensors 126 capture images of proximate components of the charging rail system 102.

In some examples, if the integrity manager 144 of the worksite controller 124 determines, based on reports 140 from one or more machines, that a fault in the charging rail system 102 exists at a particular location, the integrity manager 144 may send instructions 148 to machine controllers of machines that cause the machines to adjust operations at the worksite 100 due to the fault. For example, if a fault is detected at segment 104-2 that would prevent machines from receiving electricity from rails 106-2, the integrity manager 144 may instruct machines that are approaching segment 104-2 to slow down in order to charge batteries using electricity received from rails 106 at other segments 104 that precede segment 104-2 along route 114. Accordingly, by traveling more slowly while connected to rails 106 associated with such preceding segments 104, the batteries of the machines can be charged to a higher state of charge (SoC) by the time the machines reach segment 104-2 than the batteries would otherwise have held at segment 104-2. This may preemptively compensate for an expected loss in the SoC of the batteries that may occur during travel past segment 104-2, as the fault with segment 104-2 may prevent rails 106-2 from providing electricity to the machines. The integrity manager 144 may also instruct machines to disconnect conductor rods from the rails 106 in advance of reaching the fault at segment 104-2, and then reconnect the conductor rods to the rails 106 after passing segment 104-2.

In other examples, if a fault in the charging rail system 102 is detected at a particular location, the integrity manager 144 may send instructions 148 to machine controllers of machines that cause the machines to travel along other alternate routes. For instance, if a fault in the charging rail system 102 exists at a point along route 114, the integrity manager 144 may re-route machines to avoid route 114, for example by instructing the machines to traveling along one or more alternate routes associated with portions of the charging rail system 102 that are not associated with current faults. In some examples, such machines may operate using energy stored in batteries, or using backup power, fuel, or other sources of power, while disconnected from the charging rail system 102.

If the integrity manager 144 of the worksite controller 124 determines, based on reports 140 from one or more machines, that a fault in the charging rail system 102 exists at a particular location at the worksite 100, the integrity manager 144 may output a repair request to dispatch a repair technician to investigate and/or repair the fault. For example, the repair request can include an indication of the location of the fault, one or more images received from machines that show components of the charging rail system 102 associated with the fault, and/or other information. Accordingly, the repair technician can review data in the repair request to determine which tools may be used to repair the fault, and/or determine how one or more components of the charging rail system 102 should be repositioned to repair the fault.

Overall, the machine controller 122 of the machine 116, other machine controllers of other machines, and/or the worksite controller 124 can use images and/or other sensor data obtained by the sensors 126 of the machines to determine the integrity of the charging rail system 102. For example, if captured image data indicates that a particular component of the charging rail system 102 is out of position by more than a threshold amount, or orientations of adjacent components of the charging rail system 102 differ by more than a threshold amount, one of the machine controllers and/or the worksite controller 124 can identify a corresponding possible fault with the charging rail system 102 that may prevent machines from receiving electricity from the rails 106 and/or that may impede travel of machines along the route 114. If the machine controllers and/or the worksite controller 124 identify possible faults in the charging rail system 102, the machine controllers and/or the worksite controller 124 can initiate further inspection and/or repair of the components of the charging rail system 102, and/or adjust operations at the worksite 100 to avoid and/or compensate for the fault. Additional examples of detecting possible faults in the charging rail system 102 are described below, with respect to FIGS. 2 and 3.

FIG. 2 shows an example of the machine 116 traveling along the route 114 that passes alongside segments 104 of the charging rail system 102. The machine 116 can travel on the route 114, such as a roadway, alongside segments 104 of the charging rail system 102 positioned to one side of the route 114. For instance, the machine 116 can travel along the route 114 from a source to a destination at the worksite 100. As described above, the machine 116 can include the machine controller 122 that is configured to monitor the integrity of the charging rail system 102, for instance by detecting possible faults in the charging rail system 102 based on locations and/or orientations of one or more components of the charging rail system 102.

The machine 116 includes a frame 202, and is powered by an electric engine 204 and/or other electric power source to cause rotation of traction devices 206. Traction devices 206 are typically four or more wheels with tires, although tracks or other mechanisms for engagement with the ground along the route 114 are possible. Electric engine 204 functions to provide mechanical energy to the machine 116 based on an external electrical power source, such as the rails 106 of the charging rail system 102 described herein. An example of mechanical energy provided by electric engine 204 includes propelling traction devices 206 to cause movement of the machine 116 along the route 114, but electric engine 204 also includes components sufficient to power other affiliated operations of the machine 116. For instance, in some examples, the electric engine 204 includes equipment for converting electrical energy to provide pneumatic or hydraulic actions within the machine 116. While the electric engine 204 is configured to operate from an external electrical power source, such as the rails 106 of the charging rail system 102, in some situations the electric engine 204 may also, or alternately, operate based on energy stored in the battery 120 of the machine 116 and/or operate to store energy in the battery 120. For example, energy received by the machine 116 from the rails 106 can be stored in the battery 120, and energy stored in the battery 120 can be used to power the electric engine 204 and/or other operations of the machine 116.

As shown in FIGS. 1 and 2, the machine 116 includes the conductor rod 118 configured to receive electricity from the rails 106 of the charging rail system 102. The electricity received via the conductor rod 118 from the rails 106 can be used to power the electric engine 204, to power other operations of the machine 116, and/or to charge the battery 120. The conductor rod 118 enables an electrical connection between the machine 116 and the rails 106, including during movement of the machine 116 along the route 114.

In the example shown in FIG. 2, the conductor rod 118 is an elongated arm resembling a pole. FIG. 2 the shows conductor rod 118 positioned along a front side of the machine 116, with respect to the direction of travel of the machine 116. However, the conductor rod 118 may be attached to any convenient location within the machine 116, such as to the frame 202, in a manner to couple the conductor rod 118 to the rails 106. Shown in FIG. 2 as extending to a left side of the machine 116 toward the rails 106, the conductor rod 118 may alternatively be arranged to extend to a right side and at any desired angle from the machine 116 such that the conductor rod 118 may be coupled to the rails 106 to establish an electrical connection and transfer energy from the rails 106 to the machine 116 via the conductor rod 118.

As shown in FIG. 2, the conductor rod 118 has a barrel 208 mounted to the frame 202 of the machine 116. The barrel 208 has a hollow interior and may be a conductive metal having suitable mechanical strength and resiliency, such as aluminum. Within barrel 208, an arm 210 is retained. Arm 210 is slidably engaged within the conductor rod 118 such that it may be extended or retracted axially to adjust the reach of the conductor rod 118. For example, in a retracted position, arm 210 is caused to slide within barrel 208 of the conductor rod 118 such that a length of the conductor rod 118 roughly spans the width of the machine 116. A junction 212 serves as the interface between arm 210 and barrel 208, which is the main body of the conductor rod 118. When arm 210 is fully retracted or collapsed into barrel 208, junction 212 essentially becomes the left edge of the conductor rod 118. On the other hand, when arm 210 is extended from barrel 208 of the conductor rod 118, arm 210 may reach from the machine 116 to proximate rails 106 of the charging rail system 102 on the side of the route 114.

Within, and possibly including barrel 208, the conductor rod 118 includes a series of electrical conductors passing longitudinally, at least from a head 214 at a proximal end to a tip 216 at a distal end. Typically, the conductors within the conductor rod 118 are formed of a metallic material and are rigid. In some examples, the conductors are concentric tubes, or hollow cylinders, of solid metal such as aluminum nested together and sized to provide electrical capacity sufficient for powering the machine 116. Tubular conductors within arm 210 slidably engage with corresponding tubular conductors within barrel 208 to maintain electrical continuity as arm 210 is extended or retracted.

At a position away from the machine 116 at tip 216, a connector assembly 218 provides an interface to the rails 106 via trailing arms 220 and contactor 222. As described herein, the rails 106 of the charging rail system 102 are typically arranged along a side of the route 114, and the machine 116 is steered so that it traverses the route 114 substantially in parallel with the rails 106. Thus, in reference to FIG. 2, the rails 106 and a travel path for the machine 116 are substantially in parallel with each other. The contactor 222 is configured to maintain an electrical connection with the rails 106 while sliding along the surface of the rails 106 as the machine 116 moves. In some examples, trailing arms 220 are conductors coupled to contactor 222, each conducting voltage and current at a different electrical pole and corresponding to the conductors within the conductor rod 118.

In operation, electrical power is accessed from the rails 106 via the contactor 222, which can remain in contact with the rails 106 during movement of the machine 116, and the electrical power is conducted through trailing arms 220 into the connector assembly 218. From the connector assembly 218, the electrical power is conveyed at tip 216 through the nested tubular conductors within the arm 210 and the barrel 208 to the head 214 of the conductor rod 118 and through a head-end interface 224 to electrical elements of the machine 116. The head-end interface 224 provides at least an electrical connection between the conductor rod 118 and other elements of the machine 116, for example to power the electric engine 204, to power other electrical elements of the machine 116, to charge the battery 120 of the machine 116, and/or otherwise enable operations of the machine 116. In some examples, the head-end interface 224 may also provide an interface for inputs to control mechanical operation of the conductor rod 118, such as passageways for pressurized air of a pneumatic control system to extend and retract arm 210 or signaling for electronic controls.

As discussed above, the machine 116 can include the machine controller 122 configured to monitor the integrity of the charging rail system 102. The machine controller 122 can, for example, receive images of components of the charging rail system 102, and determine current positions of the components. If the current position of a component varies from a target position by more than a threshold amount, or if relative orientations of adjacent components differ by more than a threshold amount indicated by the target positions of the components, the machine controller 122 can determine that a possible fault with those one or more components may exist that may impact the ability of the conductor rod 118 to receive electricity from the rails 106.

Although FIG. 2 shows an example in which multiple barriers 108 are positioned end-to-end in a straight line, barriers 108 can also be spaced at least partially apart, and/or at angles relative to one another. For example, FIG. 1 shows an example in which adjacent barriers 108 are connected by joints 110, and may be angled relative to one another. The machine controller 122 can be configured to detect possible faults in the charging rail system 102 based on a difference in relative angles of adjacent barriers 108, or other components, exceeding a threshold amount, as described above. FIG. 3, discussed further below, shows an example of a segment that can be connected in a line or at an angle with adjacent segments via joints 110.

FIG. 3 shows an example of an individual segment 300 of the charging rail system 102. As discussed above, the charging rail system 102 can include a series of segments 104, which may include segment 300. For example, segment 300 can be one of, or be similar to, the segments 104 shown in FIG. 1, such as segment 104-1, segment 104-2, segment 104-3, and segment 104-4. Segments 104, such as segment 300, can be positioned on the side of the route 114 at the worksite 100 that is traversed by machine 116 and/or other machines, as discussed above with respect to FIG. 1 and FIG. 2. FIG. 3 shows the segment 300 from a side of the rails 106 at an angle looking slightly in the direction of forward travel for the machine 116 along the route 114 (i.e., in the direction of the X axis shown in FIG. 3).

The segment 300 can include a barrier 302, such as one of the barriers 108 shown in FIG. 1. As shown in FIG. 3, the barrier 302 can be, or be similar to, a roadside barrier, such as a so-called "Jersey barrier" used in highway construction. In other examples, the barrier 302 can be any form of moveable support structure, typically of a substantially elongated and/or rectangular shape. In the example shown in FIG. 3, the barrier 302 can include and/or rest on a base 304 at its bottom that extends between a first end 306 and a second end 308 of the barrier 302. The elongated and/or rectangular shape can help barrier 302 stabilize the rails 106 across a longitudinal distance parallel to base 304. In some examples, the barrier 302 can be approximately 20 feet in length along the base 304 and two feet in width across the base 304 at the first end 306 and at the second end 308. However, these dimensions, as well as others provided in this disclosure, are representative only. Other values are readily usable for achieving similar results.

In some examples, the barrier 302 can be made primarily of concrete with reinforcing steel bars (not shown) set within the concrete to enhance solidity of barrier 302. In other examples, the barrier 302 may have a different composition, such as a plastic filled with weighted material, or a different shape. The barrier 302 can be relatively heavy. For instance, in some examples in which the barrier 302 includes concrete, the barrier 302 may weigh approximately 8,000 pounds. The barrier 302 can include one or more base gaps 310 in the base 304, for lifting and placement of the barrier 302 by a forklift or similar machine. Additionally, or alternately, the barrier 302 can have one or more strap holes 312, which may be used for feeding a strap or similar implement to assist in lifting and placing the barrier 302. Additionally, the shape of the barrier 302 may enable use of commercially available barrier clamp tools, which may grip the barrier 302 through a scissor action for machine lifting without need for base gaps 310 and/or strap holes 312. Overall, the segment 300 that includes the barrier 302, and other segments 104 that include similar barriers 108, can be modular, moveable, and relocatable at the worksite 100.

As discussed above with respect to FIG. 1, in some examples adjacent segments 104 can be connected via joints 110. In the example shown in FIG. 3, the joints 110 associated with segment 300 can include a closed coupler 314 attached to the first end 306 of the barrier 302, and an open coupler 316 attached to the second end 308 of the barrier 302. The closed coupler 314 and the open coupler 316 in some examples have generally tubular configurations in which the closed coupler 314 has an outer diameter smaller than an inner diameter of the open coupler 316, and can fit concentrically within open coupler 316. Accordingly, the closed coupler 314 of segment 300 can fit within an open coupler of a first adjacent segment, while the open coupler 316 of segment 300 can accept a closed coupler of a second adjacent segment, to connect segment 300 between the two adjacent segments.

In some examples, the structures of the closed coupler 314 and the open coupler 316 can enable the insertion and retention of support poles 112 that support the rails 106 at an elevated position above ground and above the top of the barrier 302. As shown in FIG. 3, the support poles 112 associated with segment 300 can include a first support pole 318A mounted via first lower portion 320A and secured within the closed coupler 314, and second support pole 318B mounted via second lower portion 320B and secured within the open coupler 316. Coupler pins, such as first coupler pin 322A, second coupler pin 322B, and third coupler pin 322C can be inserted within horizontal holes of the closed coupler 314 to secure the first support pole 318A in place within the closed coupler 314. Although not shown in FIG. 3, similar attachments may exist between the second support pole 318B and the open coupler 316.

The support poles 112, such as the first support pole 318A and/or the second support pole 318B, can be rods, poles, posts, cylinders, stanchions, or similar structures having a length for elevating and supporting rails 106 above ground. The support poles can, in some examples, be made of dielectric material. In some examples, the first support pole 318A and the second support pole 318B may have lengths sufficient to support the rails 106 approximately eight feet off the ground, although in other examples the first support pole 318A and the second support pole 318B may support the rails 106 at higher or lower elevations relative to the ground. FIG. 3 shows a height of the rails 106 above the ground, relative to a person 324. By elevating the rails 106 above the typical reach of person 324, the first support pole 318A and the second support pole 318B can help improve safety for the delivery of electrical power for the machine 116 and/or other machines. Although the rails 106 may be electrically isolated in a manner to avoid risks of electrocution, the height of the rails 106 may also preclude individuals such as person 324 from easily touching the rails 106 while grounded. In addition, the elevated position of the rails 106 can minimize the risk of contamination by ground debris or contact from animals or unauthorized individuals on the ground.

The rails 106 can be supported by bracketing structures at upper portions of the first support pole 318A and the second support pole 318B. For example, at first upper portion 326A of the first support pole 318A, a first front plate 328A and a first rear plate 330A within a support assembly provides a bracketing structure for holding the rails 106 in place at a position vertically above the first end 306 of the barrier 302. A second front plate 328B and a second rear plate 330B provide a similar structure and function for the rails 106 at second upper portion 326B of the second support pole 318B vertically above the second end 308 of the barrier 302.

In some examples, the first front plate 328A, the first rear plate 330A, the second front plate 328B, and the second rear plate 330B can be secured respectively to the first support pole 318A and the second support pole 318B using lock pins, such as first plate pin 332A and second plate pin 332B shown in FIG. 3. Additionally, as first front plate 328A and first rear plate 330A can face each other on opposite sides of the first support pole 318A, in some examples lateral pins, such as a first lateral pin 334A and a second lateral pin 334B, may pass between the first front plate 328A and the first rear plate 330A to provide lateral stability and lock the two plates parallel to each other. In some examples, lateral pins may pass through an intermediate layer 336, such as a layer of fiberglass, that can provide a separation or buffer between the first front plate 328A and the first rear plate 330A. Similar lateral pins and/or a similar intermediate layer can be used to connect the second front plate 328B, the second rear plate 330B, and the second support pole 318B. In other examples, other alternative securing mechanisms known in the field can be used to secure the elements of the bracketing structures.

As discussed above, the first support pole 318A and the second support pole 318B can, from below, support and/or hold a section of the rails 106 in a position longitudinally along a path between the first support pole 318A and the second support pole 318B, substantially above a line that spans the top of the barrier 302. In some examples, the rails 106 that extends above the barrier 302 can include multiple parallel rails, such as an inner rail 338A, a middle rail 338B, and an outer rail 338C. Although three parallel rails are shown and discussed, the rails 106 can include fewer or more rails.

A section of the rails 106 associated with segment 300 can be electrically coupled to sections of rails 106 associated with adjacent segments 104, to form a continuous path for electrical current through the rails 106. Individual segments 104, including barriers 108, support poles 112, and/or corresponding sections of rails 106 similar to the ones shown in FIG. 3, can be modular units, such that a series of the segments 104 can be placed along the route 114 as shown in FIG. 1 and/or FIG. 2.

Elements associated with the segment 300 shown in FIG. 3, such as the shape and/or weight of the barrier 302, and/or joints 110 that include elements such as the closed coupler 314 and the open coupler 316, can be designed to impede unintended movement of the segment 300 after placement of the segment 300. However, as discussed above, one or more elements of the segment 300 can nevertheless move over time due to vibrations, ground settling, impacts from machines or other external objects, and/or other factors as described herein. Accordingly, machine controllers and/or the worksite controller 124 can be configured monitor the integrity of the charging rail system 102 at least in part by determining the location and/or orientation of the segment 300 or individual portions of the segment 300, and/or monitoring changes in such locations and/or orientations over time. For example, machine controllers and/or the worksite controller 124 can determine orientations of the first support pole 318A and/or the second support pole 318B, for instance in an X-Z plane and/or a Y-Z plane. Accordingly, the machine controllers and/or the worksite controller 124 can determine whether the first support pole 318A and/or the second support pole 318B are leaning away from an expected upright and vertical position by more than a threshold degree, such that the leaning support poles may cause, or have caused, a disconnection of one or more sections of the rails 106.

As another example, the machine controllers and/or the worksite controller 124 can determine orientations of the rails 106 and/or the top of the barrier 302 associated with segment 300, for instance in the X-Z plane. If the orientations of the rails 106 and/or the top of the barrier 302 are different than an expected orientation (such as an orientation substantially parallel to the surface of the ground), the rails 106 and/or the barrier 302 may be out of position and may cause, or have caused, a disconnection of one or more sections of the rails 106. Similarly, if heights of the adjacent components, relative to the ground or other components, vary by more than threshold amount, the rails 106 and/or the barrier 302 may be out of position and may cause, or have caused, a disconnection of one or more sections of the rails 106.

In other examples, the machine controllers and/or the worksite controller 124 can be configured monitor the integrity of the charging rail system 102 at least in part by determining the relative locations and/or orientations of adjacent segments 104, and/or monitoring changes in such relative locations and/or orientations over time. For example, if the closed coupler 314 of barrier 302 is connected to an open coupler of an adjacent barrier, the structures of the closed coupler 314 and the open coupler may permit the barrier 302 and the adjacent barrier to be oriented along angles that vary by up to 10 degrees, or another maximum angle. The machine controller 122 of the machine 116 may use image data showing the tops of the barrier 302 and the adjacent barrier to identify the angles of the lines spanning the tops of the adjacent barriers, and determine whether angles the lines vary by more than 10 degrees or another threshold maximum angle. If angles of the lines spanning the tops of the adjacent barriers vary by more than the threshold maximum angle, the machine controller 122 can determine that a bend between the adjacent barriers is too sharp, and may cause, or have caused, a disconnection of corresponding sections of the rails 106.

Figure 4:
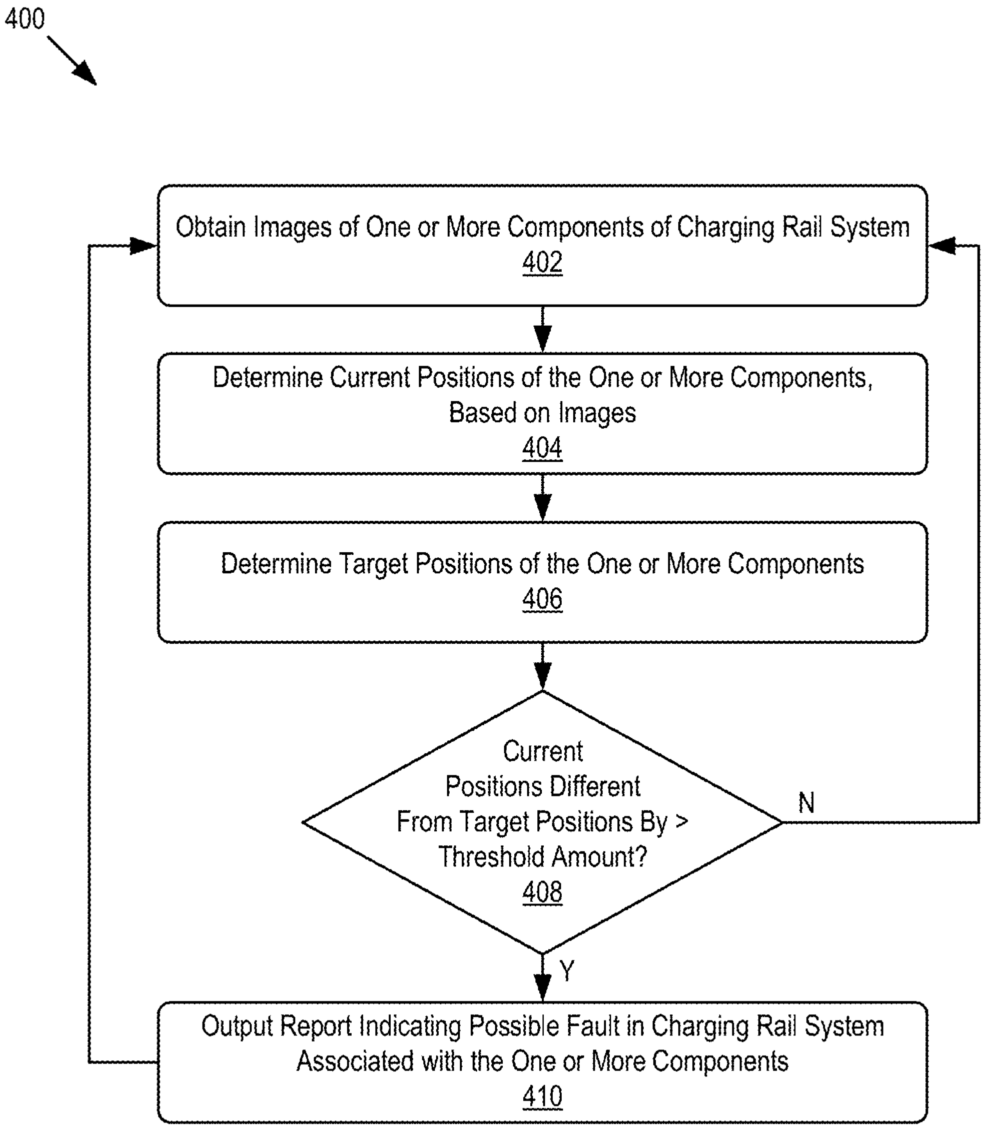
FIG. 4 shows a flowchart illustrating a first example process for monitoring the integrity of the charging rail system.
Figure 5:
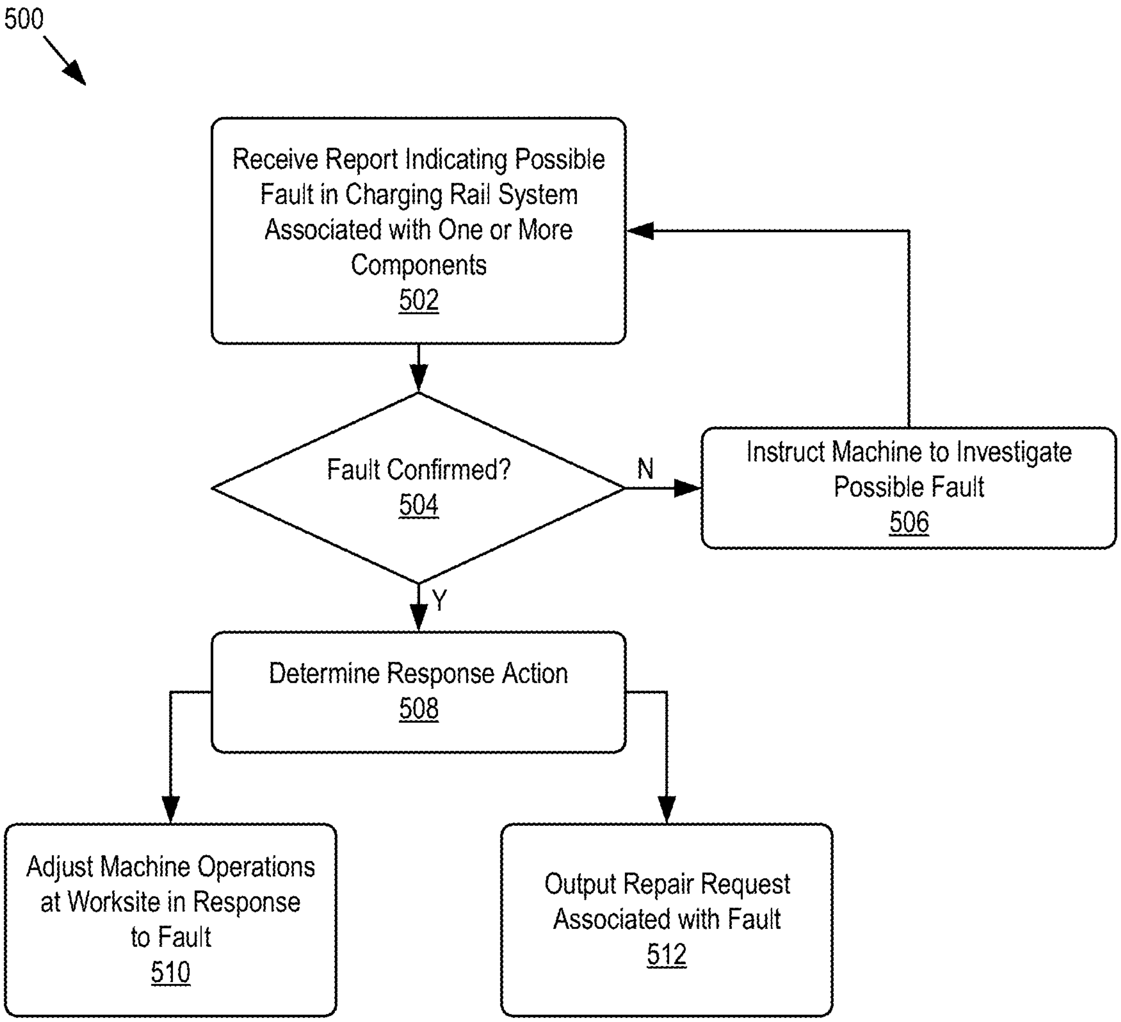
FIG. 5 shows a flowchart illustrating a second example process for monitoring the integrity of the charging rail system.

Overall, the machine controller 122 and/or the worksite controller 124 can monitor the integrity of the charging rail system 102 at least in part by determining current positions of components of the charging rail system 102, and evaluating the current positions relative to corresponding target positions. FIGS. 4 and 5, discussed further below, show flowcharts of examples processes for monitoring the integrity of the charging rail system 102.

FIG. 4 shows a flowchart 400 illustrating a first example process for monitoring the integrity of the charging rail system 102. The operations shown in FIG. 4 can be performed by a computing system, such as the machine controller 122 or the worksite controller 124. FIG. 7, discussed further below, describes an example system architecture for such a computing system associated with the machine controller 122 or the worksite controller 124.

At block 402, the computing system can obtain images of one or more components of the charging rail system 102. The components can include, one or more segments 104 and/or components associated with one or more segments 104, such as sections of rails 106, barriers 108, joints 110 between adjacent barriers 108, support poles 112, and/or other components. The images can be images captured by one or more sensors 126 of one or more machines, and/or that are interpolated images generated based on a combination of images captured by the sensors 126 of the one or more machines. The images can include visual images, infrared images, depth information, distance information, and/or other sensor data. In some examples, if the computing system is the machine controller 122 of the machine 116, the images obtained at block 402 can be images captured locally by sensors 126 of the machine 116. In other examples, if the computing system is the worksite controller 124, the images obtained at block 402 can be images that are captured by sensors 126 of one or more machines, and that are transmitted to the worksite controller 124 in reports 140.

At block 404, the computing system can determine one or more current positions of the one or more components, based on the images obtained at block 402. For example, an instance of the image analyzer 128 executing on the computing system can identify individual components in the images. Based on identifying the individual components in the images, the image analyzer 128 and/or an instance of the integrity evaluator 132 executing on the computing system can also determine locations of the components at the worksite 100, relative to other components, and/or relative to the machine 116. The image analyzer 128 and/or the integrity evaluator 132 can also use the image data to determine orientations of the components at the locations. For example, at block 404 the computing system can determine an orientation of a particular component in three-dimensional space, and/or determine orientations of adjacent components relative to each other.

At block 406, the computing system can determine one or more target positions of the one or more components. For example, the site map 130 can include data indicating target positions of the one or more components. The target position of a single component can be a target location for the component at the worksite 100, a target orientation for the component at that target location, and/or threshold amounts that indicate tolerable variances in the location and/or orientation of the component. Data indicating target positions of adjacent components can indicate tolerable variances in the locations and/or orientations of the adjacent components relative to each other.

At block 408, the computing system can determine whether the one or more current positions of the one or more components determined at block 404 are different from one or more corresponding target positions by more than a threshold amount. For example, if the computing system determined a current orientation of a particular component of the charging rail system 102 at block 404, the computing system can determine whether the current orientation of the particular component is different from a target orientation of the particular component by more than a threshold amount. As another example, if the computing system determined relative orientations of adjacent components of the charging rail system 102 at block 404, the computing system can determine whether the adjacent components extend along lines oriented at angles that are different by more than a threshold maximum angle indicated by the site map 130.

If the computing system determines that the one or more current positions of the one or more components is not different from one or more corresponding target positions by more than a threshold amount (block 408—No), the computing system can return to block 402 to obtain images of additional components of the charging rail system 102. However, if the computing system determines that the one or more current positions of the one or more components are not different from one or more corresponding target positions by more than a threshold amount (block 408—Yes), the computing system can output a report at block 410 indicating a possible fault in the charging rail system 102 associated with the one or more components.

For example, if the computing system is the machine controller 122 of machine 116, at block 410 the machine controller 122 can transmit a report to the worksite controller 124 that identifies the one or more components, and indicates the possible fault associated with the one or more components in the charging rail system 102. As another example, the machine controller 122 can transmit a report or notification to another machine, such as a machine that is behind the machine 116 in the route 114, that causes a machine controller of the other machine to use the process shown in FIG. 4 to attempt to also detect and/or confirm the fault in the charging rail system 102 detected by the machine controller 122 of machine 116. As still another example, if the machine 116 has an on-board display for a human operator, the machine controller 122 can cause the on-board display to present information associated with the possible fault to the human operator, such that the human operator can further investigate or confirm the possible fault. In examples in which the computing system is the worksite controller 124, at block 410 the worksite controller 124 can display an alert or notification in the user interface 146, and/or transmit corresponding reports or notifications to machine controllers of one or more machines at the worksite 100.

If the computing system is the machine controller 122, and transmits a report indicating a possible fault to the worksite controller 124 at block 410, the worksite controller 124 can evaluate the report to confirm the fault in the charging rail system 102 and/or to determine one or more actions in response to the fault. For example, the worksite controller 124 can evaluate the report using the process described further below with respect to FIG. 5.

FIG. 5 shows a flowchart 500 illustrating a second example process for monitoring the integrity of the charging rail system 102. The operations shown in FIG. 5 can be performed by a computing system, such as the machine controller 122 or the worksite controller 124. FIG. 7, discussed further below, describes an example system architecture for such a computing system associated with the machine controller 122 or the worksite controller 124.

At block 502, the computing system can receive a report that indicates a possible fault, in the charging rail system 102, associated with one or more components of the charging rail system 102. In some examples, the computing system can be the worksite controller 124, and the worksite controller 124 can receive the report from a machine controller of a machine at block 502. For example, the machine controller of the machine can use the process discussed above with respect to FIG. 4 to identify a possible fault, and to send a corresponding report indicating the possible fault to the worksite controller 124 at block 502. In other examples, at block 502 a machine controller of a machine may send a report to the worksite controller 124 that indicates a possible fault if the machine is unable to receive electricity from rails at one or more segments 104 of the charging rail system 102. As still another example, the report received at block 502 can include one or more images captured by one or more sensors 126 of a machine, and the worksite controller 124 can use process discussed above with respect to FIG. 4 to identify a possible fault based on the images. If the computing system is a machine controller of a machine, the report received at block 502 can be images captured by sensors 126 of the machine, such that the machine controller can use the process discussed above with respect to FIG. 4 to detect the possible fault.

At block 504, the computing system can determine whether the fault with the charging rail system 102 is confirmed. For example, if the computing system is the worksite controller 124, the worksite controller 124 can be configured to determine that a fault is confirmed if the worksite controller 124 receives at least a threshold number of reports from machine controllers of one or more machines that are indicative of the same possible fault. Accordingly, if the worksite controller 124 has received less than the threshold number of reports about the possible fault indicated by the report received at block 502, such that the fault is not yet confirmed, the indication of the possible fault may potentially be due to faulty sensors 126 of one or more machines. The worksite controller 124 can accordingly take actions to attempt to verify that the fault with the charging rail system 102 is real. For example, if the possible fault is not yet confirmed (Block 504—No), at block 506 the worksite controller 124 can send instructions 148 to machine controllers of one or more machines that cause the machine controllers to further investigate the possible fault. Similarly, if the computing system is a machine controller of a machine, and the possible fault is not yet confirmed (Block 504—No), at block 506 the machine controller can instruct itself and/or machine controllers of other machines to further investigate the possible fault.

For example, the instructions 148 sent at block 506 may cause one or more machines to travel past the components associated with the possible fault and capture images of the components. The instructions 148 may identify the location of the possible fault and/or the components, and in some examples may cause the machines to travel by the location of the possible at a speed less than or equal to a maximum observation speed. In some examples, the machine controllers can use captured images to determine positions of the components, as discussed above with respect to FIG. 4, that may or may not indicate the possible fault. The machine controllers can accordingly send additional reports 140 that may indicate the possible fault to the computing system, such that the computing system may be able to confirm the fault based on one or more additional reports 140 at block 504. In other examples, the machines can transmit additional captured images to the computing system, such that the computing system can analyze the images and attempt to confirm the fault at block 504

If the fault in the charging rail system 102 is confirmed (Block 504—Yes), at block 508 the computing system can determine at least one response action associated with the fault in the charging rail system 102. The response actions can include adjust machine operations of one or more machines at the worksite at block 510, outputting a repair request associated with the fault at block 512, and/or other response actions.

For example, at block 510 the computing system may adjust machine operations of one or more machines at the worksite to compensate for the fault, and/or to cause the machines to avoid the fault. For instance, the computing system may send instructions 148 to machine controllers of one or more machines that cause the machines to slow down during travel in advance of the location of the fault. Accordingly, the slowed machines may remain connected to rails 106 at segments 104 preceding the fault in the charging rail system 102 for longer-than-normal periods of time, to charge batteries to higher levels that may compensate for battery charge expected to be lost when the machines reach the location of the fault in the charging rail system 102. The computing system may alternately send instructions 148 to machine controllers of one or more machines that re-route the machines to alternate routes that are not associated with the charging rail system 102, and/or that are associated with other portions of the charging rail system 102 that are not currently associated with a fault.

As another example, at block 512 the computing system may output a repair request to dispatch a repair technician to investigate and/or repair the fault. The repair request can include an indication of the location of the fault, one or more images received from machines that show components of the charging rail system 102 associated with the fault, and/or other information. Accordingly, the repair technician can review data in the repair request to determine which tools may be used to repair the fault, and/or determine how one or more components of the charging rail system 102 should be repositioned to repair the fault.

In some examples, the computing system can also use received reports 140 to determine or estimate a severity of the fault, and can determine a response action at block 508 based at least in part on the severity of the fault. For example, if reports 140 indicate that a fault is likely associated with loose connections between rails 106, such that the rails 106 may still be capable of providing a lower-than-expected amount of electricity to machines, the lower amount of electricity may still be sufficient to charge and/or power machines. Accordingly, the computing system may output a repair request, but allow machines to continue connecting to the rails 106 at the location of the fault to receive at least some electricity. However, if reports 140 indicate that the fault is associated with an entirely broken electrical connection and/or other damaged components of the charging rail system 102, the computing system may output a repair request and also instruct machines to avoid the location of the fault until repairs are complete.

In some examples, the computing system can perform some or all the operations shown in FIG. 5 automatically. However, the computing system can also display information about the charging rail system 102, including information about possible or confirmed faults with the charging rail system 102, in user interfaces of one or more machines, and/or the user interface 146 of the worksite controller 124. Accordingly, in some examples, the computing system can perform some of the operations shown in FIG. 5 in response to user input received via the user interface 146 or other user interfaces. For example, if a report received at block 502 indicates a possible fault or a confirmed fault, the user interface 146 of the worksite controller 124 can display a corresponding alert for a user, and the user may provide user input to determine the response action at block 510. FIG. 6, discussed further below, shows an example of the user interface 146 of the worksite controller 124.

FIG. 6 shows an example of the user interface 146 of the worksite controller 124. As discussed above, the user interface 146 may display information associated with components of the charging rail system 102 based on the site map 130, reports 140, and/or other data. For example, the user interface 146 can include a site map section 602 and/or a summary section 604.

The site map section 602 can be a visual depiction of the site map 130 that indicates locations of individual segments 104 of the charging rail system 102. The site map section 602 may also display locations of roads, obstacles, machines, and/or other elements at the worksite 100 that are indicated by, and/or tracked in association with, the site map 130. The user interface 146 may allow a user to move, scroll, zoom, and/or otherwise change the view shown in the site map section 602. The site map section 602 can use colors, patterns, and/or other indicators to identify the current status associated with various segments 104 of the charging rail system 102. As a non-limiting example, the site map section 602 can present representations of individual segments 104 in green if no faults have been detected, in yellow if possible faults have been detected, or in red if faults have been confirmed.

The summary section 604 may display a table, chart, list, or other data that includes summaries of individual segments 104 of the charging rail system 102. For example, the summary section 604 can display a segment identifier for each segment, a current status of each segment, and/or other information associated with each segment. For example, the other information can indicate a location of the segment, a last-determined position of the segment, a target position of the segment, current and/or previous images of the segment, portions of corresponding reports 140 received from one or more machines, and/or other information. In some examples, a user may select an option to view such additional information associated with a particular selected segment.

The user interface 146 can display an information window 606 associated with individual segments 104 and/or multiple segments 104. For example, a user may select representations of one or more segments 104 in the site map section 602 and/or the summary section 604 to cause the user interface 146 to display the corresponding information window 606. The information window 606 may indicate issues associated with possible or confirmed faults, display an image section 608 associated with the selected segments 104 or corresponding faults, display a response options section 610 associated with the selected segments 104 or corresponding faults, and/or display other types of data.

The image section 608 can display one or more images, and/or corresponding data, associated with the one or more selected segments 104. For example, the image section 608 can display the most recent image of the one or more selected segments 104 captured by sensors 126 of a machine. The most recent image may be displayed in some examples as a thumbnail image that a user can select to access and view a full version of the image. The image section 608 can also display metadata associated with the most recent image, such as a date and time the image was captured, an identifier of the machine that captured the image, and/or other information. In some examples, the image section 608 can also display the previous images of the one or more selected segments 104, and/or provide user-selectable options to view such previous images.

The response options section 610 can display user-selectable options that a user can select to respond to a possible fault or confirmed fault indicated by the information window 606. For example, the response options section 610 can display a set of user-selectable options to dispatch a machine to capture additional images associated with the one or more selected segments 104, to dispatch a repair technician to investigate and/or repair the one or more selected segments 104, and/or other response options. In some examples, the user interface 146 can also include response options, or other user-selectable options to confirm a possible fault, dismiss a possible fault, add notes about selected segments 104, delete information about selected segments 104, and/or otherwise interact with the worksite controller 124.

FIG. 7 shows an example system architecture 700 for a computing system 702. In some examples, the computing system 702 can be, or be associated with, the machine controller 122, an ECM, and/or other on-board computing devices of the machine 116. In other example, the computing system 702 can be, or be associated with, the worksite controller 124. The computing system 702 can include one or more computing devices, servers, or other computing elements that include one or more processors 704, memory 706, and communication interfaces 708.

The processor(s) 704 can operate to perform a variety of functions as set forth herein. The processor(s) 704 can include one or more chips, microprocessors, application specific integrated circuits (ASICs), field programmable gate arrays (FPGAs) and/or other programmable circuits, central processing units (CPUs), graphics processing units (GPUs), digital signal processors (DSPs), and/or other processing units or components known in the art. In some examples, the processor(s) 704 can have one or more arithmetic logic units (ALUs) that perform arithmetic and logical operations, and/or one or more control units (CUs) that extract instructions and stored content from processor cache memory, and executes such instructions by calling on the ALUs during program execution. The processor(s) 704 can also access content and computer-executable instructions stored in the memory 706, and execute such computer-executable instructions.

The memory 706 can be volatile and/or non-volatile computer-readable media including integrated or removable memory devices including random-access memory (RAM), read-only memory (ROM), flash memory, a hard drive or other disk drives, a memory card, optical storage, magnetic storage, and/or any other computer-readable media. The computer-readable media can be non-transitory computer-readable media. The computer-readable media can be configured to store computer-executable instructions that can be executed by the processor(s) 704 to perform operations described herein.

For example, the memory 706 can include a drive unit and/or other elements that include machine-readable media. A machine-readable medium can store one or more sets of instructions, such as software or firmware, that embodies any one or more of the methodologies or functions described herein. The instructions can also reside, completely or at least partially, within the processor(s) 704 and/or communication interface(s) 708 during execution thereof by the computing system 702. For example, the processor(s) 704 can possess local memory, which also can store program modules, program data, and/or one or more operating systems.

The memory 706 can store modules and data 710, such as data and/or computer-executable instructions associated with monitoring the integrity of the charging rail system 102. As an example, if the computing system 702 is associated with the machine controller 122, the modules and data 710 can include data and/or computer-executable instructions associated with the image analyzer 128, the site map 130, the integrity evaluator 132, and/or other operations or elements of the machine controller 122. As another example, if the computing system 702 is associated with the worksite controller 124, the modules and data 710 can include data and/or computer-executable instructions associated with the integrity manager 144, the site map 130, the user interface 146, and/or other operations or elements of the worksite controller 124. In some examples, the integrity manager 144 of the worksite controller 124 can include instances of the image analyzer 128 and/or the integrity evaluator 132. The modules and data 710 can also include other data and/or computer-executable instructions that can be utilized by the computing system 702 to perform or enable performing any action taken by the computing system 702. For example, the modules and data 710 can include a platform, operating system, and/or applications, as well as data utilized by the platform, operating system, and/or applications.

The communication interfaces 708 can include transceivers, modems, interfaces, antennas, and/or other components that can transmit and/or receive data over networks or other data connections. In some examples, the communication interfaces 708 can be, or include, the wireless communication interfaces 142 that the computing system 702 can use to send and/or receive data, such as the reports 140 and/or the instructions 148.

INDUSTRIAL APPLICABILITY

As described above, machine controllers of machines and/or the worksite controller 124 can monitor the integrity of the charging rail system 102. For instance, if image data captured by sensors 126 of one or more machines indicates that current locations and/or orientations of one or more components of the charging rail system 102 are different from target locations and/or orientations by more than a threshold amount, the image data can indicate a possible fault in the charging rail system 102. The possible fault in the charging rail system 102 may cause, or have caused, loose or broken electrical connections that may prevent machines from receiving electricity from the charging rail system 102. Such possible faults may therefore impact operations of one or more machines on the worksite 100 that are at least partially powered using electricity received from the charging rail system 102, and accordingly negatively impact productivity and overall operations at the worksite 100.

In some examples, the machines may be autonomous machines that do not have human operators on-board. As such, a human operator may not be present on a machine to view components of the charging rail system 102 and/or notice problems with the integrity of the charging rail system 102 as the machine travels by the components. Even if a human operator is on board a machine, the human operator may be focused on driving or otherwise operating the machine, and may not notice slight changes in the positions of components of the charging rail system 102 that may impact the integrity of the charging rail system 102.

However, as described herein, the sensors 126 of the machines can capture images of components of the charging rail system 102 that can indicate whether the components are within threshold tolerances of target locations and/or orientations. Accordingly, the images can be used by the machine controllers of the machines and/or the worksite controller 124 to automatically detect possible faults in the charging rail system 102, regardless of whether a human operator is on-board a machine.

Additionally, when possible faults in the charging rail system 102 are automatically detected, based on image data captured by sensors 126 of one or more machines, various response actions can be automatically initiated to further investigate the possible faults, confirm the faults, repair the faults, and/or adjust operations of machines at the worksite 100 based on the faults. Accordingly, by automatically detecting possible faults, in some cases response actions can be initiated more quickly than in other systems that rely on manual inspections, and larger or longer negative impacts to overall operations at the worksite 100 can be avoided.

While aspects of the present disclosure have been particularly shown and described with reference to the embodiments above, it will be understood by those skilled in the art that various additional embodiments may be contemplated by the modification of the disclosed machines, systems, and method without departing from the spirit and scope of what is disclosed. Such embodiments should be understood to fall within the scope of the present disclosure as determined based upon the claims and any equivalents thereof.

What is claimed is:

1. A computer-implemented method comprising:

displaying, via a user interface, a map of a charging rail system at a worksite, wherein the charging rail system is configured to provide electricity to machines at the worksite;

determining an integrity status of at least one component of the charging rail system, based at least in part on a position of the at least one component indicated by an image of the at least one component; and presenting, via the user interface, and in association with the map, an indication of the integrity status of the at least one component of the charging rail system.

2. The computer-implemented method of claim 1, wherein:

determining the integrity status comprises:

determining, based on the image of the charging rail system, the position of the at least one component; and determining a difference between the position of the at least one component and a target position for the at least one component, and the target position is based on at least one of:

an expected location of the at least one component at the worksite, an expected orientation of the at least one component, or the position of the at least one component relative to an adjacent component of the charging rail system.

3. The computer-implemented method of claim 2, further comprising determining that the integrity status is associated with a possible fault, based on determining that the difference between the position of the at least one component and the target position exceeds a threshold.

4. The computer-implemented method of claim 1, wherein the at least one component comprises at least one of:

one or more rail sections, one or more segments of the charging rail system, one or more barriers associated with the one or more segments, one or more joints that connect adjacent segments of the one or more segments, or one or more support poles that support rails above the one or more barriers or the one or more joints.

5. The computer-implemented method of claim 1, wherein the image is captured by a sensor on one of the machines at the worksite.

6. The computer-implemented method of claim 1, wherein:

the charging rail system comprises a plurality of segments, determining the integrity status comprises determining individual integrity statuses of respective segments of the plurality of segments, and presenting the indication of the integrity status comprises displaying, via the user interface, indications of the individual integrity statuses in association with at least one of a table or depictions of the respective segments on the map.

7. The computer-implemented method of claim 6, wherein displaying the indications of the individual integrity statuses comprises coloring the depictions of the respective segments, in the user interface and on the map, with colors corresponding to the individual integrity statuses.

8. The computer-implemented method of claim 1, wherein:

the integrity status indicates that the at least one component is associated with a possible fault, and presenting the indication of the integrity status comprises displaying an alert notification that presents one or more of:

the image of the image of the at least one component, one or more historical images of the at least one component, or selectable response options comprising at least one of:

a dispatch option to dispatch a machine to capture one or more additional images of the at least one component, or a repair option to dispatch a technician to investigate or repair the possible fault.

9. The computer-implemented method of claim 1, wherein the indication of the integrity status of the at least one component, presented via the user interface, further comprises one or more of:

an identifier of the at least one component, or an option to access additional information about the at least one component via the user interface.

10. A computer-implemented method comprising:

receiving, by a worksite controller, a set of images that depict a component of charging rail system at a different times, wherein the charging rail system is configured to provide electricity to machines at a worksite;

determining, by the worksite controller, and based on the set of images, positions of the component at the worksite at the different times;

determining, by the worksite controller, and based on the positions of the component at the worksite at the different times, a movement trend of the component; and predicting, by the worksite controller, based at least in part on the movement trend of the component, a future time at which a difference between a position of the component and an expected position is likely to exceed a threshold.

11. The computer-implemented method of claim 10, further comprising displaying, in a user interface, an indication of the movement trend of the component in association with a map of the charging rail system or the worksite.

12. The computer-implemented method of claim 10, wherein images, in the set of images, are captured by one or more sensors of one or more of the machines at the worksite.

13. The computer-implemented method of claim 12, further comprising assigning, by the worksite controller, and in response to predicting the future time, at least one of the machines to capture, via the one or more sensors, additional images of the component.

14. The computer-implemented method of claim 10, further comprising assigning, by the worksite controller, and in response to predicting the future time, a technician to move the component closer to the expected position before the future time.

15. The computer-implemented method of claim 10, wherein the component comprises at least one of:

a rail section of the charging rail system, a segment of the charging rail system, a barrier of the segment, a joint that connect adjacent segments of the charging rail system, or a support pole that supports one or more rails above the barrier or the joint.

16. A computing system, comprising:

one or more processors; and memory storing computer-executable instructions that, when executed by the one or more processors, cause the one or more processors to perform operations comprising:

receive sensor data associated with a charging rail system at a worksite, the charging rail system being configured to provide electricity to machines at the worksite;

determine, based on the sensor data, a current position of a component of the charging rail system;

determine that the current position is different from a target position by at least a threshold amount; and identify, based on the current position being different from the target position by at least the threshold amount, a possible fault in the charging rail system.

17. The computing system of claim 16, wherein the sensor data is captured by one or more sensors of one or more of the machines at the worksite.

18. The computing system of claim 16, wherein the machines comprise electric vehicles configured to:

travel at the worksite while at least occasionally being connected to the charging rail system, and operate based at least in part on the electricity provided by the charging rail system while the electric vehicles are connected to the charging rail system.

19. The computing system of claim 16, wherein determining the current position of the component, based on the sensor data, comprises processing the sensor data via at least one of machine learning or image processing techniques.

20. The computing system of claim 16, wherein the target position is based on at least one of:

an expected location of the component, an expected orientation of the component, or the current position of the component relative to an adjacent component of the charging rail system.

* * * * *